(12) United States Patent
King et al.

(10) Patent No.: US 11,961,175 B2
(45) Date of Patent: Apr. 16, 2024

(54) ANISOTROPIC TEXTURE FILTERING BY COMBINING RESULTS OF ISOTROPIC FILTERING AT A PLURALITY OF SAMPLING POINTS WITH A GAUSSIAN FILTER

(71) Applicant: Imagination Technologies Limited, Kings Langley (GB)

(72) Inventors: Rostam King, Hertfordshire (GB); Kenneth Rovers, St Albans (GB)

(73) Assignee: Imagination Technologies Limited, Kings Langley (GB)

( * ) Notice: Subject to any disclaimer, the term of this patent is extended or adjusted under 35 U.S.C. 154(b) by 2 days.

(21) Appl. No.: 17/874,019

(22) Filed: Jul. 26, 2022

(65) Prior Publication Data
US 2023/0055989 A1 Feb. 23, 2023

(30) Foreign Application Priority Data

Jul. 26, 2021 (GB) ..................... 2110742
Jul. 26, 2021 (GB) ..................... 2110743
Jul. 26, 2021 (GB) ..................... 2110744

(51) Int. Cl.
*G06T 15/04* (2011.01)
*G06F 17/18* (2006.01)
(Continued)

(52) U.S. Cl.
CPC .............. *G06T 15/04* (2013.01); *G06F 17/18* (2013.01); *G06T 7/60* (2013.01); *G06T 15/503* (2013.01)

(58) Field of Classification Search
CPC ......... G06T 7/60; G06T 15/04; G06T 15/503; G06F 17/18
See application file for complete search history.

(56) References Cited

U.S. PATENT DOCUMENTS 6,292,193 B1 * 9/2001 Perry ..................... G06T 15/04
345/428
8,068,118 B1 11/2011 Toksvig et al.
(Continued)

FOREIGN PATENT DOCUMENTS

GB 2583154 B 4/2021

OTHER PUBLICATIONS

Anonymous, "Efficient Gaussian blur with linear sampling," URL: https://www.rastergrid.com/blog/2010/09/efficient-gaussian-blurwith-linear-sampling/, 2010, pp. 1-11.
(Continued)

*Primary Examiner* — Kee M Tung
*Assistant Examiner* — Jed-Justin Imperial
(74) *Attorney, Agent, or Firm* — Potomac Law Group, PLLC; Vincent M DeLuca

(57) ABSTRACT

A method of performing anisotropic texture filtering includes generating one or more parameters describing an elliptical footprint in texture space; performing isotropic filtering at each of a plurality of sampling points along a major axis of the elliptical footprint, wherein a spacing between adjacent sampling points of the plurality of sampling points is proportional to $\sqrt{1-\eta^{-2}}$ units, wherein $\eta$ is a ratio of a major radius of an ellipse to be sampled and a minor radius of the ellipse to be sampled, wherein the ellipse to be sampled is based on the elliptical footprint; and combining results of the isotropic filtering at the plurality of sampling points with a Gaussian filter to generate at least a portion of a filter result.

20 Claims, 17 Drawing Sheets

(51) Int. Cl.
    *G06T 7/60*         (2017.01)
    *G06T 15/50*       (2011.01)

(56) References Cited

U.S. PATENT DOCUMENTS 11,216,990 B2    1/2022    King
2022/0215612 A1*  7/2022    Fielding .................. G06T 7/44

OTHER PUBLICATIONS

Chung, "Gaussian kernel smoothing," Cornell University Library, 2012; section 4; p. 5-p. 8; figure 2.

Manson Josiah et al, "Bilinear Accelerated Filter Approximation," Computer Graphics Forum : Journal of the European Association for Computer Graphics, vol. 33, 2014, pp. 33-40.

McCormack et al, "Simple and Table Feline: Fast Elliptical Lines for Anisotropic Texture Mapping", pp. 1-16; Oct. 1999, COMPAQ Western Research Laboratory; URL: http://www.hpl.hp.com/techreports/Compaq-DEC/WRL-99-1.pdf.

McCormack et al, "Feline: Fast Elliptical Lines for Anisotropic Texture Mapping," pp. 1-8, Conference: Proceedings of the 26th annual conference on Computer graphics and interactive techniques, Jan. 1999.

Heckbert, "Fundamentals of Texture Mapping and Image Warping," Master's Thesis, University of California at Berkeley, Dept. of Electrical Engineering and Computer Science, 1989.

* cited by examiner

ANISOTROPIC TEXTURE FILTERING BY COMBINING RESULTS OF ISOTROPIC FILTERING AT A PLURALITY OF SAMPLING POINTS WITH A GAUSSIAN FILTER

TECHNICAL FIELD

This application relates to texture filtering and in particular, anisotropic texture filtering.

BACKGROUND

A graphics processing unit (GPU) may be used to process geometry data (e.g. vertices defining primitives or patches) generated by an application in order to generate image data. Specifically, a GPU may determine pixel values (e.g. colour values) of an image to be stored in a frame buffer which may be output to a display.

A GPU may process the received geometry data in two phases—a geometry processing phase and a rasterization phase. In the geometry processing phase a vertex shader is applied to the received geometry data (e.g. vertices defining primitives or patches) received from an application (e.g. a game application) to transform the geometry data into the rendering space (e.g. screen space). Other functions such as clipping and culling to remove geometry (e.g. primitives or patches) that falls outside of a viewing frustum, and/or lighting/attribute processing may also be performed in the geometry processing phase.

In the rasterization phase the transformed primitives are mapped to pixels and the colour is identified for each pixel. This may comprise rasterizing the transformed geometry data (e.g. by performing scan conversion) to generate primitive fragments. The term "fragment" is used herein to mean a sample of a primitive at a sampling point, which is to be processed to render pixels of an image. In some examples, there may be a one-to-one mapping of pixels to fragments. However, in other examples there may be more fragments than pixels, and this oversampling can allow for higher quality rendering of pixel values.

The primitive fragments that are hidden (e.g. hidden by other fragments) may then be removed through a process called hidden surface removal. Texturing and/or shading may then be applied to primitive fragments that are not hidden to determine pixel values of a rendered image. For example, in some cases, the colour of a fragment may be identified by applying a texture (e.g. an image) to the fragment. As is known to those of skill in the art, a texture, which may also be referred to as a texture map, is an image which is used to represent precomputed colour, lighting, shadows etc. Texture maps are formed of a plurality of texels (i.e. colour values), which may also be referred to as texture elements or texture pixels. Applying a texture to a fragment generally comprises mapping the location of the fragment in the render space to a position or location in the texture and using the colour at that position in the texture as the texture colour for the fragment. The texture colour may then be used to determine the final colour for the fragment. A fragment whose colour is determined from a texture may be referred to as a texture mapped fragment.

As fragment positions rarely map directly to a specific texel, the texture colour of a fragment is typically identified through a process called texture filtering. In the simplest case, which may be referred to as point sampling, point filtering or nearest-neighbour interpolation, a fragment in screen space is mapped to a position in the texture (i.e. to a position in texture space) and the value (i.e. colour) of the closest texel to the identified position in the texture is used as the texture colour of the fragment. However, in most cases, the texture colour for a fragment is determined using more complicated filtering techniques which combine a plurality of texels close to the identified position in the texture. Examples of more complicated filtering techniques include isotropic filtering techniques and anisotropic filtering techniques. Isotropic filtering techniques uniformly filter textures across perpendicular axes, whereas anisotropic filtering techniques do not uniformly filter textures, instead filtering textures based on the local (i.e. anisotropic) warping that the texture undergoes in the neighbourhood of a fragment. In some cases, the warping may take into account the texture's location on the screen relative to the camera angle. Examples of isotropic filtering techniques include, but are not limited to, bilinear filtering and trilinear filtering.

In bilinear filtering the four nearest texels to the identified position in the texture are combined by a pairwise linear weighted average according to distance. Compared with point sampling, this generally provides a smoother reconstruction of a continuous image from the bitmapped texture. Bilinear filtering has proven to be particularly suitable for applications in which textures, as a result of texture mapping, are magnified. However, neither point sampling nor bilinear filtering provide an adequate solution when textures are minified as they do not take into account the size of the fragment footprint in texture space.

Point sampling and bilinear filtering can be combined with a technique referred to as mipmapping. In mipmapping, a series (or pyramid) of mipmaps are pre-computed (e.g. generated in advance and/or offline). Each mipmap is a lower resolution version of the original texture. Specifically, according to standards, each mipmap has a height and width that are a factor of 2 smaller than the previous level, wherein odd dimensions are rounded down, and any dimension less than one are rounded up to one. The standards assign an integer level of detail (LOD) to each mipmap (zero for the highest resolution and increasing by one for each subsequent level). Mipmaps allow an appropriate level of detail to be selected for a fragment, in the sense that the mipmap level whose texel footprints most closely match the fragment's footprint is a good candidate for filtering. Specifically, higher resolution mipmaps can be used for fragments/objects that are closer to the screen/viewer, and lower resolution mipmaps can be used for fragments/objects that are further from the screen/viewer. Mipmaps thus provide an efficient solution to enable texture minification without having to introduce additional filtering, with potentially unbounded computation and memory bandwidth cost. When point sampling and bilinear filtering are used with mipmapping, the texel(s) are selected from the closest mipmap level (or a scaled version of the closest mipmap level).

Trilinear filtering comprises performing bilinear filtering on the two closest mipmap levels (one higher resolution and one lower resolution) and then linearly interpolating between the results of the bilinear filtering. In analogy with bilinear filtering, trilinear filtering provides a smoother approximation of the continuous range of minification that a texture may undergo.

Neither bilinear nor trilinear filtering takes into account the fact that a fragment footprint may be warped by different amounts in different directions (e.g. when the texture is at a receding angle with respect to the screen/viewer), making it difficult to approximate the fragment footprint in texture space using a single parameter (e.g. the level of detail). In such cases, bilinear or trilinear filtering can produce blurry results.

Anisotropic filtering addresses this problem by combining several texels around the identified position in the texture, but on a sample pattern mapped according to the projected shape of the fragment in screen space onto the texture (i.e. in texture space). While anisotropic filtering can reduce blur at extreme viewing angles, anisotropic filtering is more computationally intensive than isotropic filtering.

The texture colour(s) output by the texture filtering may then be used as input to a fragment shader. As is known to those of skill in the art, a fragment shader (which may alternatively be referred to as a pixel shader) is a program (e.g. a set of instructions) that operates on individual fragments to determine the colour, brightness, contrast etc. thereof. A fragment shader may receive as input a fragment (e.g. the position thereof) and one or more other input parameters (e.g. texture co-ordinates) and output a colour value in accordance with a specific shader program. In some cases, the output of a pixel shader may be further processed. For example, where there are more samples than pixels, an anti-aliasing technique, such as multi-sample anti-aliasing (MSAA), may be used to generate the colour for a particular pixel from multiple samples (which may be referred to as sub-samples). Anti-aliasing techniques apply a filter, such as, but not limited to, a box filter to the multiple samples to generate a single colour value for a pixel.

A GPU which performs hidden surface removal prior to performing texturing and/or shading is said to implement 'deferred' rendering. In other examples, a GPU might not implement deferred rendering in which case texturing and shading may be applied to fragments before hidden surface removal is performed on those fragments. In either case, the rendered pixel values may be stored in memory (e.g. frame buffer).

The embodiments described below are provided by way of example only and are not limiting of implementations which solve any or all of the disadvantages of known methods and hardware for performing anisotropic texture filtering.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods of performing anisotropic texture filtering. The methods include: generating one or more parameters describing an elliptical footprint in texture space; performing isotropic filtering at each of a plurality of sampling points along a major axis of the elliptical footprint, wherein a spacing between adjacent sampling points of the plurality of sampling points is proportional to $\sqrt{1-\eta^{-2}}$ units, wherein $\eta$ is a ratio of a major radius of an ellipse to be sampled and a minor radius of the ellipse to be sampled, wherein the ellipse to be sampled is based on the elliptical footprint; and combining results of the isotropic filtering at the plurality of sampling points with a Gaussian filter to generate at least a portion of a filter result.

A first aspect provides a method of performing anisotropic texture filtering, the method comprising: generating one or more parameters describing an elliptical footprint in texture space; performing isotropic filtering at each of a plurality of sampling points along a major axis of the elliptical footprint, wherein a spacing between adjacent sampling points of the plurality of sampling points is proportional to $\sqrt{1-\eta^{-2}}$ units, wherein $\eta$ is a ratio of a major radius of an ellipse to be sampled and a minor radius of the ellipse to be sampled, wherein the ellipse to be sampled is based on the elliptical footprint; and combining results of the isotropic filtering at the plurality of sampling points with a Gaussian filter to generate at least a portion of a filter result.

The spacing between adjacent sampling points of the plurality of sampling points may be proportional to $\sqrt{1-\eta^{-2}}$ units by a proportionality factor, the proportionality factor may be $$\frac{1}{\beta},$$

where $\beta$ is a sampling rate of the Gaussian filter.

The spacing between adjacent sampling points of the plurality of sampling points may be proportional to $\sqrt{1-\eta^{-2}}$ units by a proportionality factor, the proportionality factor being $$\frac{1}{\beta} * \frac{\eta}{\lceil \eta \rceil},$$

where $\beta$ is a sampling rate of the Gaussian filter.

A unit may correspond to the minor radius of the ellipse to be sampled.

Performing isotropic filtering at each of the plurality of sampling points may comprise performing bilinear filtering at each of the plurality of sampling points.

Performing isotropic filtering at each of the plurality of sampling points may comprise performing trilinear filtering at each of the plurality of sampling points.

Performing isotropic filtering at a sampling point of the plurality of sampling points may comprise: performing a first isotropic filtering at the sampling point at a first mipmap level; performing a second isotropic filtering at the sampling point at a second mipmap level; and interpolating between a result of the first isotropic filtering and a result of the second isotropic filtering to generate a result of the isotropic filtering for the sampling point.

The ellipse to be sampled may be the ellipse defined by the elliptical footprint.

Performing isotropic filtering at each of the plurality of sampling points may comprise performing first isotropic filtering at each sampling point of the plurality of sampling points; and the method may further comprise: performing second isotropic filtering at each of a second plurality of sampling points along the major axis of the elliptical footprint, wherein a spacing between adjacent sampling points of the second plurality of sampling points is proportional to $\sqrt{1-\eta^{-2}}$ units, wherein $\eta$ is a ratio of a major radius of a second ellipse to be sampled and a minor radius of the second ellipse to be sampled, wherein the second ellipse to be sampled is based on the elliptical footprint; combining results of the second isotropic filtering; and interpolating between the combination of the results of the first isotropic filtering and the combination of the results of the second isotropic filtering.

The first isotropic filtering may be performed at a first mipmap level and the second isotropic filtering may be performed at a second mipmap level.

The ellipse to be sampled may be a higher eccentricity ellipse with respect to the elliptical footprint, and the second ellipse to be sampled may be a lower eccentricity ellipse with respect to the elliptical footprint.

The ellipse to be sampled may have the same eccentricity as the elliptical footprint and may be larger than the elliptical footprint, and the second ellipse to be sampled may have the same eccentricity as the elliptical footprint and may be smaller than the elliptical footprint.

The number of sampling points in the plurality of sampling points may be different than the number of sampling points in the second plurality of sampling points.

The plurality of sampling points may be symmetrically positioned about the midpoint of the major axis of the elliptical footprint.

The plurality of sampling points may comprise N sampling points, wherein N is equal to $2\alpha\beta\lceil\eta\rceil$, $2\alpha$ is a width of the Gaussian filter in standard deviations, and $\beta$ is a sampling rate of the Gaussian filter.

A location of the plurality of sampling points may be expressed by $$(n+\psi)(\kappa)\sqrt{1-\eta^{-2}}\,\rho_-\left(\frac{\rho_+}{\rho_+}\right)$$

where n is any integer in the half-open interval $$\left[-\frac{N}{2}-\psi,+\frac{N}{2}-\psi\right),$$

$\psi$ may be an offset between −1 and 1, the plurality of sampling points may comprise N sampling points, the spacing between adjacent sampling points of the plurality of sampling points may be proportional to $\sqrt{1-\eta^{-2}}$ units by a proportionality factor $\kappa$, $\rho_-$ is the minor radius of the ellipse to be sampled, $\rho_+$ is the major radius of the ellipse to be sampled and $\rho_+$ is a major axis radius vector.

When N is even $\psi$ may be ½; and/or when N is odd $\psi$ may be 0.

The one or more parameters describing the elliptical footprint in texture space may comprise one or more of the major axis of the elliptical footprint, a length of the major axis of the elliptical footprint, and a length of the minor axis of the elliptical footprint.

The results of the isotropic filtering may be combined by a sequence of linear interpolations, wherein each linear interpolation in the sequence of linear interpolations comprises blending a result of a previous linear interpolation in the sequence with the isotropic filtering result for one or more of the plurality of sampling points, the one or more of the plurality of sampling points for a linear interpolation being closer to a middle point of the major axis of the elliptical footprint than the one or more of the plurality of sampling points for the previous linear interpolation in the sequence.

A second aspect provides a method of generating an image, the method comprising performing anisotropic texture filtering in accordance with the first aspect, and generating an image based on the at least a portion of the filter result.

A third aspect provides a texture filtering unit for use in a graphics processing system, the texture filtering unit configured to perform the method of the first aspect.

A fourth aspect provides a graphics processing system comprising the texture filtering unit of the third aspect.

A fifth aspect provides a method of performing anisotropic texture filtering, the method comprising: generating one or more parameters describing an elliptical footprint in texture space; performing isotropic filtering at each of N sampling points along a major axis of an ellipse to be sampled, wherein a spacing between adjacent sampling points of the N sampling points is proportional to $\sqrt{1-\eta^{-2}}$ units by a proportionality factor $\kappa$, wherein $\eta$ is a ratio of a major radius of the ellipse to be sampled and a minor radius of the ellipse to be sampled, wherein the major axis of the ellipse to be sampled is aligned with a major axis of the elliptical footprint and a unit corresponds to the minor radius of the ellipse to be sampled; and combining results of the isotropic filtering at the N sampling points with a Gaussian filter to generate at least a portion of a filter result; wherein $\kappa$ is $$\frac{1}{\beta} \text{ or } \frac{1}{\beta}*\frac{\eta}{\lceil\eta\rceil},$$

N is equal to $2\alpha\beta\lceil\eta\rceil$, $2\alpha$ is a width of the Gaussian filter in standard deviations, and $\beta$ is a parameter that controls a density of the sampling points.

The texture filtering units and/or the graphics processing systems described herein may be embodied in hardware on an integrated circuit. There may be provided a method of manufacturing, at an integrated circuit manufacturing system, a texture filtering unit and/or a graphics processing system as described herein. There may be provided an integrated circuit definition dataset that, when processed in an integrated circuit manufacturing system, configures the system to manufacture a texture filtering unit and/or a graphics processing system as described herein. There may be provided a non-transitory computer readable storage medium having stored thereon a computer readable description of a texture filtering unit or a graphics processing system that, when processed in an integrated circuit manufacturing system as described herein, causes the integrated circuit manufacturing system to manufacture an integrated circuit embodying the texture filtering unit or the graphics processing system.

There may be provided an integrated circuit manufacturing system comprising: a non-transitory computer readable storage medium having stored thereon a computer readable description of a texture filtering unit or a graphics processing system as described herein; a layout processing system configured to process the computer readable description so as to generate a circuit layout description of an integrated circuit embodying the texture filtering unit or the graphics processing system; and an integrated circuit generation system configured to manufacture the texture filtering unit or the graphics processing system according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
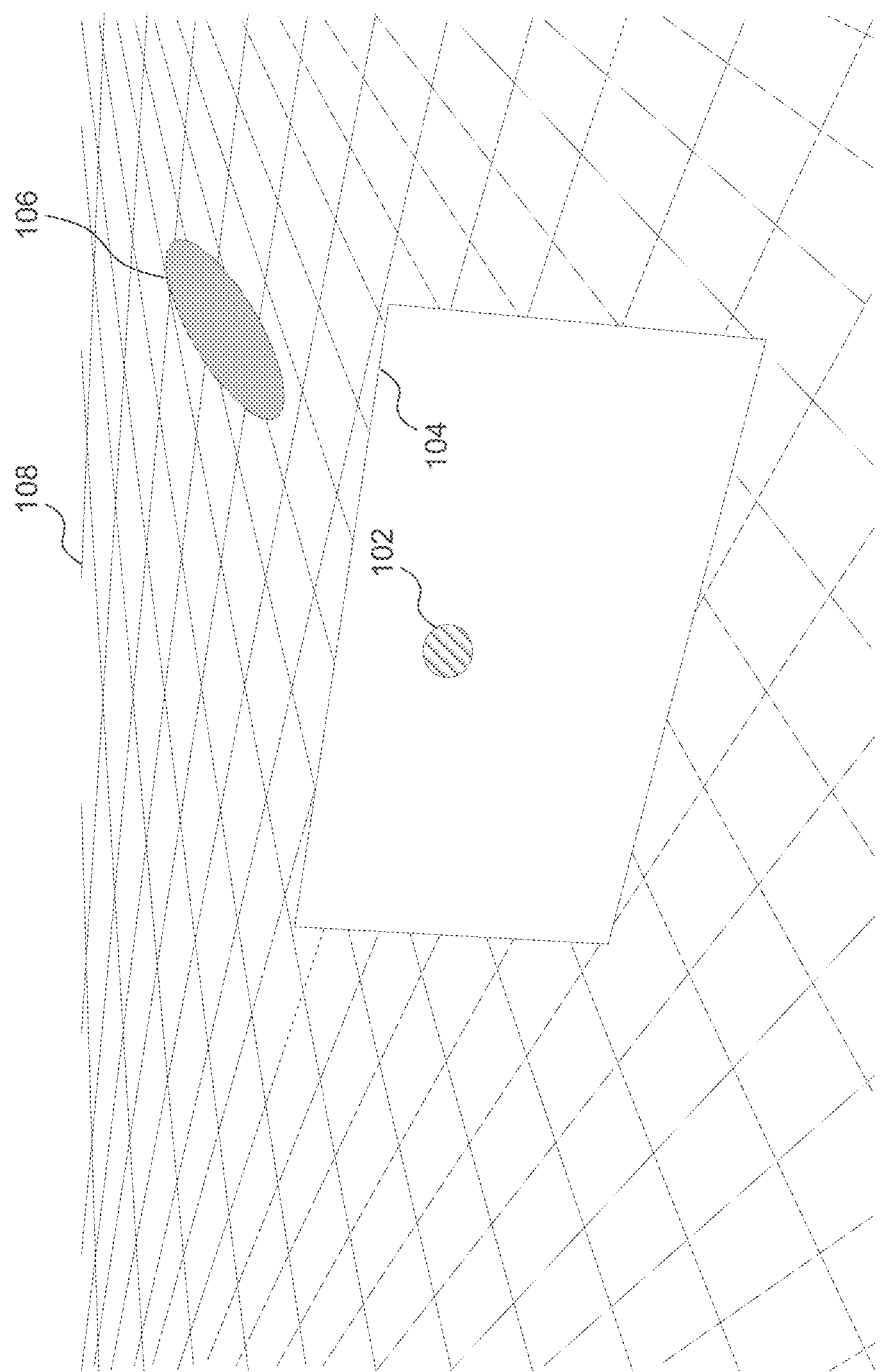
FIG. 1 is a schematic diagram illustrating mapping a circular footprint in screen space to an elliptical footprint in texture space.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described above, texture mapping is a process in which a texture (i.e. an image) is mapped onto an object in a 3D scene. For example, a texture representing a brick pattern may be applied to a wall object to make it look as if the wall is made of brick. The term "screen space" is used herein to represent the 3D coordinate system of the display in which 3D objects such as primitives and patches are defined. Each pixel in screen space is defined by pixel coordinates (x, y) and a depth z. The term "texture space" is used herein to represent the 2D coordinate system of a texture. Each texel in texture space is defined by texture coordinates (u, v).

In anisotropic texture filtering, several texels around an identified position in a texture are combined, but on a sample pattern mapped according to the projected shape of the filter in screen space onto the texture (i.e. in texture space). Anisotropic texture filtering can improve the look of textures that are angled and farther from the camera compared to other filtering methods, such as isotropic texture filtering methods. One method known for implementing anisotropic texture filtering is the elliptical weighted average (EWA) filter technique first proposed by Paul S. Heckbert and Ned Greene. In the EWA technique, which is described with reference to FIG. 1, pixels are treated as having a circular footprint 102 in screen space 104 which project to an ellipse 106 with arbitrary orientation in texture space 108. The texture filtering result is then calculated as the convolution of the texels inside the elliptical footprint with the projected weights of the pixel filter. If the centre of the pixel in texture space can be translated to (0,0) then the elliptical footprint of a pixel can be calculated according to equation (1) where $d^2$ is the distance squared from the centre of the pixel when the pixel is mapped back to screen space:

$$d^2(u,v) = Au^2 + Buv + Cv^2 \quad (1)$$

where $$A_{nn} = (\partial v/\partial x)^2 + (\partial v/\partial y)^2$$

$$B_{nn} = -2*(\partial u/\partial x * \partial v/\partial x + \partial u/\partial y * \partial v/\partial y)$$

$$C_{nn} = (\partial u/\partial x)^2 + (\partial u/\partial y)^2$$

$$F = A_{nn}C_{nn} - B_{nn}^2/4$$

$$A = A_{nn}/F$$

$$B = B_{nn}/F$$

$$C = C_{nn}/F.$$

The partial derivatives ($\partial u/\partial x$, $\partial v/\partial x$, $\partial u/\partial y$, $\partial v/\partial y$) represent the rate of change of of u and v in texture space relative to changes in x and y in screen space. Texels inside the elliptical footprint are then sampled, weighted (according to a filter profile), and accumulated. The result is then divided by the sum of the weights (which is the elliptical filter's volume in texture space).

EWA, when used in conjunction with a Gaussian filter profile, which may be referred to herein as Gaussian EWA, is considered to be one of the highest quality texture filtering techniques and is often used as a benchmark to measure the quality of other filtering techniques. However, the EWA technique has proven difficult to implement in hardware. Specifically, it can be expensive, in terms of computing resources, to calculate the weights and ellipse parameters, and in some cases may require obtaining many texels.

Figure 2:
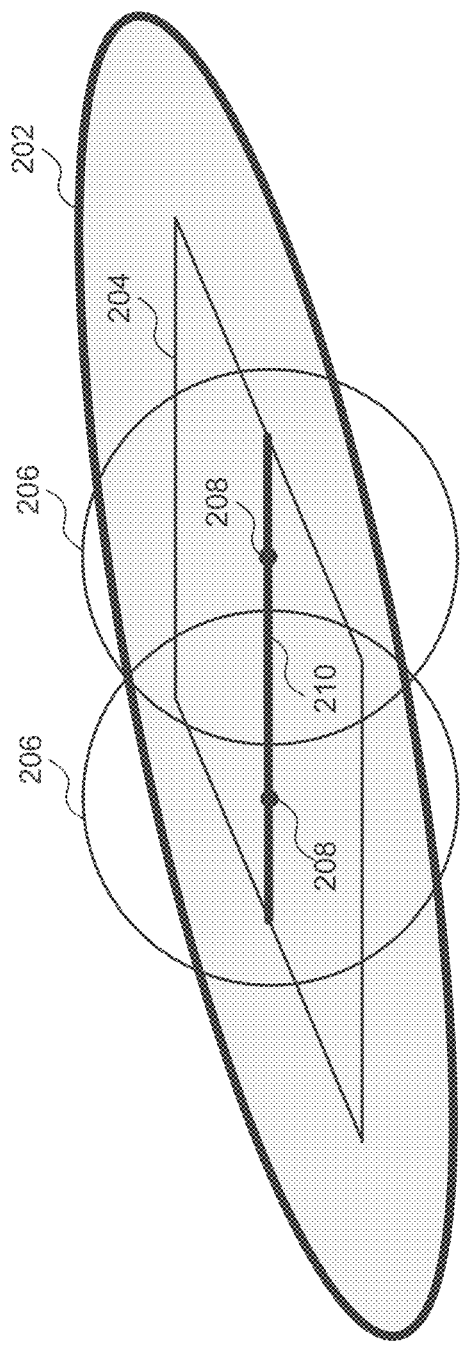
FIG. 2 is a schematic diagram illustrating a first example method of performing anisotropic texture filtering.

Different methods known to the Applicant, which is not an admission that they are well-known, have been proposed to approximate Gaussian EWA which can be more easily implemented in hardware. Some of these techniques involve performing isotropic filtering, such as trilinear filtering, at several points along a line in the ellipse and combining the results of the isotropic filtering. For example, in one method which is described with reference to FIG. 2, and may be referred to as the TEXRAM method, the ellipse 202 is represented by a parallelogram 204, and trilinear filtering 206 is performed at several sample points 208 (which may be referred to as probes) along the major axis 210 of the parallelogram 204, and a weighted average of the results of the trilinear filtering is generated. Specifically, TEXRAM uses the four partial derivatives ($\partial u/\partial x$, $\partial v/\partial x$, $\partial u/\partial y$, $\partial v/\partial y$)) to create two vectors in texture space ($\partial u/\partial x$, $\partial v/\partial x$) and ($\partial u/\partial y$, $\partial v/\partial y$). The sample points 208 are placed along the line 210 that has the length and slope of the longer of the two vectors.

Figure 3:
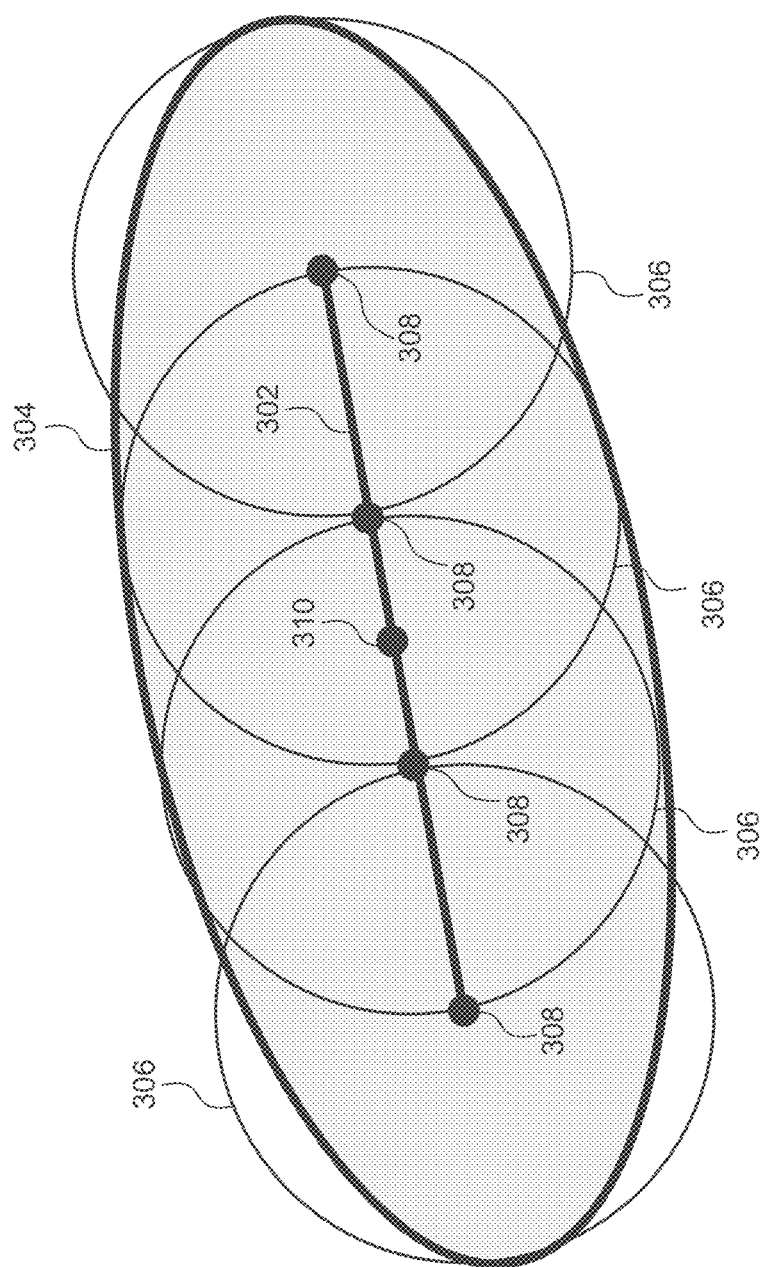
FIG. 3 is a schematic diagram illustrating a second example method of performing anisotropic texture filtering.

In another method which is illustrated with reference to FIG. 3, and may be referred to as the Feline method, the major axis 302 of the ellipse 304 is generated, trilinear filtering 306 is performed at several sample points 308 (which may be referred to as probes) along the major axis 302 of the ellipse, and the results of the trilinear filtering are combined with Gaussian weights. The length of the sampling line (lineLength) is calculated as set out in equation (2) below where $\rho_+$ is the major radius of the ellipse and $\rho_-$ is the minor radius of the ellipse. The sampling points are distributed symmetrically about the midpoint ($u_m$, $v_m$) 310 of the sampling line such that the location of the $n^{th}$ sampling point ($u_n$, $v_n$) can be calculated as shown in equation (3) below, wherein n=+/−1, +/−3, if the number of probes is even; and n=0, +/−2, +/−4 if the number of probes is odd. The distance between the sampling points is $\sqrt{\Delta u^2 + \Delta v^2}$ where $\Delta u$ and $\Delta v$ are calculated in accordance with equations (4) and (5) shown below where theta is the angle of the minor axis and iProbes is the number of probes. A Gaussian weight is then applied to each probe n by computing the distance squared of the probe from the centre of the pixel filter in screen space, then exponentiating. The accumulated probe results are then divided by the sum of all the weights applied.

$$lineLength = 2*(\rho_+ - \rho_-) \quad (2)$$

$$(u_n, v_n) = (u_m, v_m) + \frac{n}{2}*(\Delta u, \Delta v) \quad (3)$$

$$\Delta u = \cos(theta) * lineLength/(iProbes - 1) \quad (4)$$

$$\Delta v = \sin(theta) * lineLength/(iProbes - 1) \quad (5)$$

In some cases, instead of computing the stepping vector ($\Delta u$, $\Delta v$) with trigonometric functions, it may be determined by scaling the longer vector directly.

The inventors have identified that Gaussian EWA can be more accurately estimated by performing isotropic filtering at several sample points along the major axis of the ellipse where the distance between sample points is proportional to $\sqrt{1-\eta^{-2}}$ units, $\eta$ being the ratio of the major radius of the ellipse ($\rho_+$) and the minor radius of the ellipse ($\rho_-$), such that $$\eta = \frac{\rho_+}{\rho_-}.$$

The ratio between the major radius of the ellipse and the minor radius of the ellipse (i.e. $\eta$) may be referred to as the anisotropic ratio. As described in more detail below, when the distance between sampling points is proportional to $\sqrt{1-\eta^{-2}}$ units the maximum error in the estimation is not dependent on the anisotropic ratio.

The inventors have also identified that, independent of the spacing of the sample points along the major axis, Gaussian EWA can be more accurately estimated by combining the results of the isotropic filtering in a recursive manner. As described in more detail below, not only can this decrease the cumulative error that may occur with summing a plurality of small values, but it can also simplify the calculation of the weights.

In some cases, the two techniques may be combined to obtain an even more accurate estimate of Gaussian EWA.

Accordingly, described herein are methods and texture filtering units for performing anisotropic filtering of a texture using one or more of these techniques.

Figure 4:
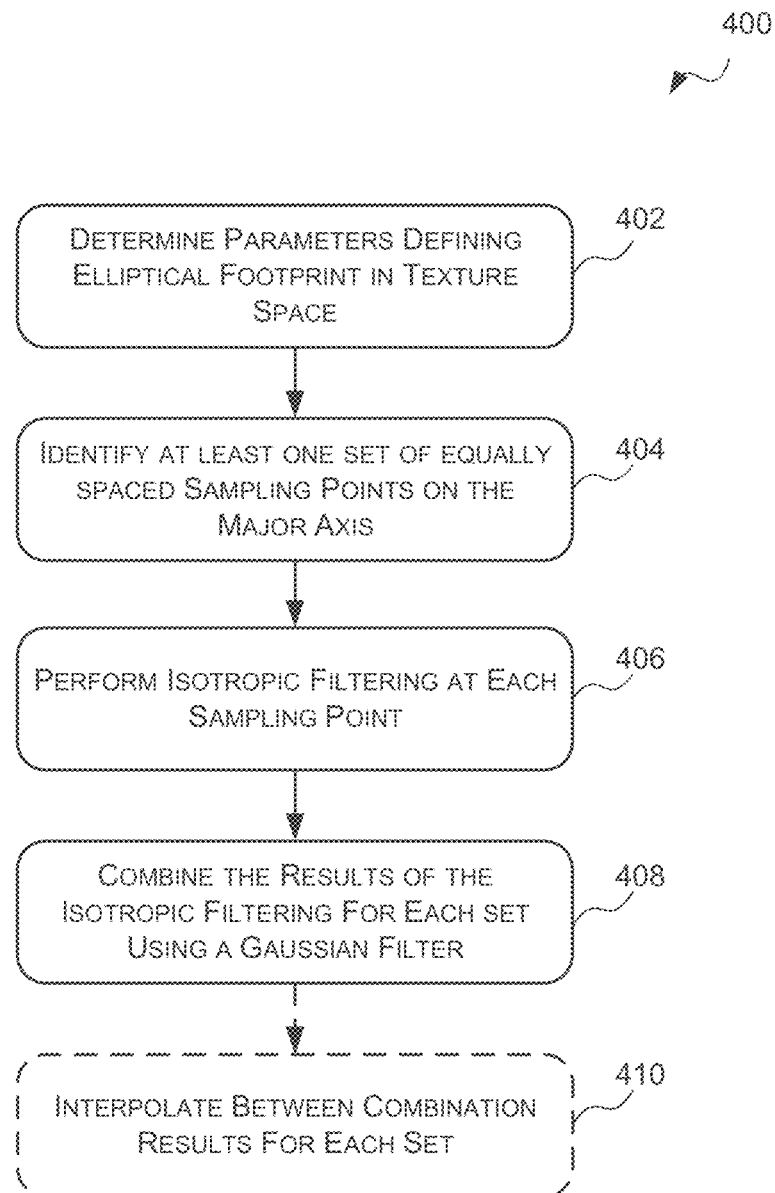
FIG. 4 is a flow diagram of an example method of performing anisotropic texture filtering in accordance with an embodiment.

Reference is now made to FIG. 4 which illustrates an example method 400 for performing anisotropic filtering on a texture. The method 400 begins at block 402 where parameters defining an elliptical footprint in texture space (e.g. elliptical footprint 502 of FIG. 5) are generated based on information defining the relationship between screen space and texture space and information identifying a point or position of interest in the texture. The elliptical footprint represents the projection of a circular or elliptical footprint of a sampling kernel in screen space into texture space. The sampling kernel identifies, for a pixel or fragment of interest, the pixels or fragments near or surrounding the pixel or fragment of interest for which the corresponding texture colour is to be used to determine the texture colour for the pixel or fragment of interest.

The information identifying the position of interest in the texture may comprise a set of texture co-ordinates (u, v) that identify a position in the texture that corresponds to a particular fragment or pixel in screen space. The set of texture co-ordinates may define the midpoint (e.g. midpoint 510 of FIG. 5) of the desired elliptical footprint.

In some cases, which may be referred to as explicit level of detail cases, the information defining the relationship between screen space and texture space may include the partial derivatives ($\partial u/\partial x$, $\partial v/\partial x$, $\partial u/\partial y$, $\partial v/\partial y$) that represent the rate of change of u and v in texture space relative to changes in x and y in screen space. In other cases, which may be referred to as implicit level of detail cases, the information defining the relationship between screen space and texture space may include information from which the partial derivatives can be determined, or at least estimated. For example, the information defining the relationship between screen space and texture space may comprise texture co-ordinates corresponding to neighbouring pixels/fragments to the relevant pixel/fragment (e.g. a 2×2 block of pixels/fragments). In some cases, the parameters of the elliptical footprint may also be based on the dimensions of the texture.

The parameters defining the elliptical footprint that may be generated may include, but are not limited to, the major axis of the elliptical footprint (e.g. the major axis 504 of the elliptical footprint 502 of FIG. 5), and the lengths of the major and minor axes ($\rho_+$ and $\rho_-$, which may also be referred to as the major radius and minor radius respectively).

There are many known methods for generating the parameters of an elliptical footprint in texture space. The parameters of the elliptical footprint in texture space may be generated in any suitable manner. In some cases, the major axis may be identified by performing a single value decomposition (SVD) of the total derivative matrix of partial derivatives (e.g. Jacobian). This involves taking a matrix M, squaring it $MM^T$ (or $M^T M$) and then diagonalising. This is illustrated by equation (6):

$$1 = x^T x = (J^{-1}u)^T J^{-1} u = u^T J^{-1^T} J^{-1} u = u^T (JJ^T)^{-1} u \tag{6}$$

where J is the Jacobian of the partial derivatives as shown in equation (7)

$$J = \begin{pmatrix} \frac{\partial u}{\partial x} & \frac{\partial u}{\partial y} \\ \frac{\partial v}{\partial x} & \frac{\partial v}{\partial y} \end{pmatrix} \tag{7}$$

and the Jacobian squared is as shown in equation (8).

$$JJ^T = \begin{pmatrix} \left(\frac{\partial u}{\partial x}\right)^2 + \left(\frac{\partial u}{\partial y}\right)^2 & \frac{\partial u}{\partial x}\frac{\partial v}{\partial x} + \frac{\partial u}{\partial y}\frac{\partial v}{\partial y} \\ \frac{\partial u}{\partial x}\frac{\partial v}{\partial x} + \frac{\partial u}{\partial y}\frac{\partial v}{\partial y} & \left(\frac{\partial v}{\partial x}\right)^2 + \left(\frac{\partial v}{\partial y}\right)^2 \end{pmatrix} \tag{8}$$

The inverse of the Jacobian squared can then be expressed as shown in equation (9).

$$(JJ^T)^{-1} = \frac{1}{\det JJ^T} \begin{pmatrix} \left(\frac{\partial v}{\partial x}\right)^2 + \left(\frac{\partial v}{\partial y}\right)^2 & -\left(\frac{\partial u}{\partial x}\frac{\partial v}{\partial x} + \frac{\partial u}{\partial y}\frac{\partial v}{\partial y}\right) \\ -\left(\frac{\partial u}{\partial x}\frac{\partial v}{\partial x} + \frac{\partial u}{\partial y}\frac{\partial v}{\partial y}\right) & \left(\frac{\partial u}{\partial x}\right)^2 + \left(\frac{\partial u}{\partial y}\right)^2 \end{pmatrix} \tag{9}$$

It will be evident to a person of skill in the art that this results in equation (1). It will also be evident to a person of skill in the art that this is an example only. Another example method for generating the parameters of the elliptical footprint in texture space is described in GB Patent No. 2583154 which is hereby incorporated by reference in its entirety.

Once the parameters defining the elliptical footprint in texture space have been identified the method 400 proceeds to block 404.

Figure 5:
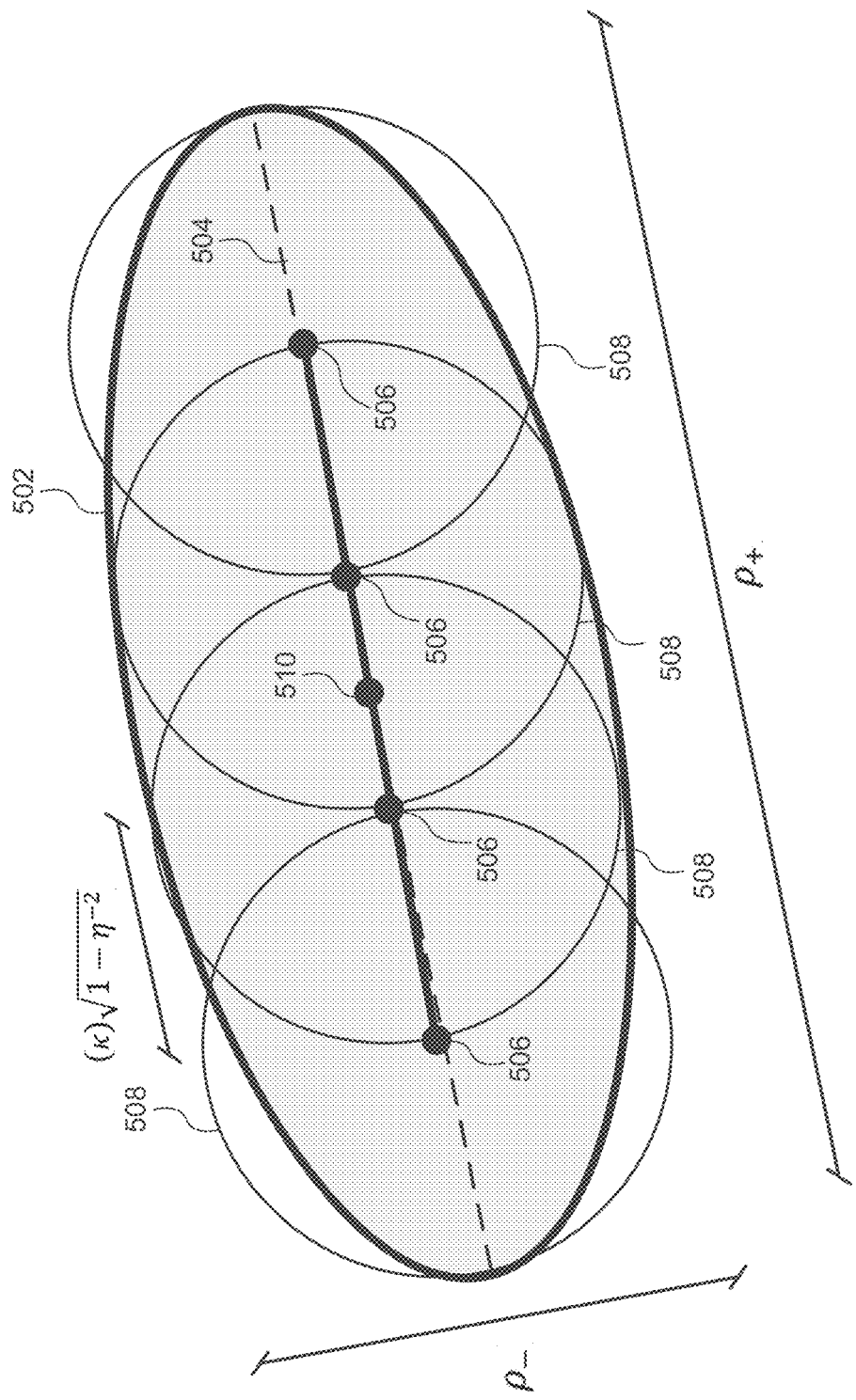
FIG. 5 is a schematic diagram illustrating the method of FIG. 4.

At block 404, at least one set of equally spaced sampling points (which may also be referred to as sample points) along the major axis are identified (e.g. sampling points 506 on the major axis 504 of FIG. 5 may be identified). Each set of equally spaced sampling points corresponds to, is associated with, or is related to, an ellipse in texture space to be sampled. The ellipse to be sampled is based on, and/or related to, the elliptical footprint identified in block 402. In some cases, the ellipse to be sampled is the elliptical footprint identified in block 402. However, in other cases, described below, the ellipse to be sampled may be smaller than, larger than, more eccentric than, or less eccentric than the elliptical footprint identified in block 402. Identifying a set of equally spaced sampling points along the major axis may comprise (i) identifying a number of sampling points in the set; (ii) identifying a spacing of the sampling points in the set; and/or (iii) identifying a location of at least one sampling point in the set (from which the other sampling points can be identified).

The number of sampling points in a set, N, may be selected based on the ratio of the major radius ($\rho_+$) and the minor radius ($\rho_-$) of the associated ellipse to be sampled (i.e. the anisotropic ratio $\eta$). In some cases, described in more detail below, N may be proportional to the anisotropic ratio $\eta$), a sampling rate $\beta$, and the width of the Gaussian kernel in standard deviations (which is preferably a multiple of 2 standard deviations—i.e. $2\alpha$). In general, $\alpha$ is a parameter that controls the width of the kernel. In some cases, $\alpha$ is an integer. In general, the sampling rate $\beta$ is a parameter that controls how closely spaced along the major axis kernel (i.e. the Gaussian kernel) the samples are. The higher $\beta$ is, the more closely spaced the samples are along the major axis. For example, if $\beta$ is two, samples are taken every one standard deviation of the minor axis, instead of every two standard deviations of the minor axis when $\beta$ is one. In some cases, $\beta$ is an integer. $\beta$ may be one. In some cases, N may be equal to $2\alpha\beta\lceil\eta\rceil$. The parameters $\alpha$ and $\beta$ may be explicitly provided (e.g. based on a sampling budget), or may be dynamically selected based on information provided. For example, in some cases, the information provided may simply indicate a level of quality—e.g. high quality or low quality, and $\alpha$ and $\beta$ may be selected accordingly.

Preferably the distance $\sigma$ between sampling points in each set is proportional, by a proportionality factor $\kappa$, to $\sqrt{1-\eta^{-2}}$ units. As described in more detail below, it has been determined that when the distance or spacing $\sigma$ between sampling points is proportional to $\sqrt{1-\eta^{-2}}$ units, the upper bound on the error associated with the anisotropic filtering result is not dependent on the anisotropic ratio, thereby ensuring a balanced quality of approximation for a specified performance budget. In some cases, $\kappa$ is an integer. In some cases, K is one. Accordingly, in some cases, identifying a spacing of the sampling points in the set may comprise calculating $\sqrt{1-\eta^{-2}}$ and identifying a spacing between adjacent sampling points that is proportional to the calculated $\sqrt{1-\eta^{-2}}$ units.

In some cases, the proportionality factor $\kappa$ may be equal to $$\frac{1}{\beta}\frac{\eta}{\lceil\eta\rceil}.$$

As described in more detail below, when the proportionality factor $\kappa$ is equal to $$\frac{1}{\beta}\frac{\eta}{\lceil\eta\rceil}$$

the Gaussian weights that are applied in block 408 to the results of the isotropic filtering performed in block 406 may only be generated for integer anisotropic ratios. This can reduce the cost (e.g. tabulation of weights) of implementing the method. However, the disadvantage of this expression of the proportionality factor is that the spacing (and hence approximation quality) is discontinuous and specifically may jump discontinuously when there is a jump from one integer anisotropic ratio to another. This is especially true if the reconstruction quality is low (for example if the sample rate is low, e.g. $\beta=\frac{1}{2}$) which may result in discontinuous jumps in a filtered image, which may be prominent.

In other cases, the proportionality factor $\kappa$ may be equal to $$\frac{1}{\beta}.$$

As described in more detail below, when the proportionality factor is equal to $$\frac{1}{\beta}$$

the Gaussian weights that are applied to the results of the isotropic filtering are not limited to integer anisotropic ratios which makes calculation and storage of the weights more complicated, but the spacing is continuous for various ratios and gives a uniform error in the limit as the number of samples tends to infinity.

In some cases, the first sample in a set may be offset from the middle point, midpoint or centre point of the major axis by a fraction $\psi$ of the spacing (the fraction $\psi$ may also be referred to as the offset). In these cases, the location of each sample point n can be expressed by $$(n+\psi)(\kappa)\sqrt{1-\eta^{-2}}\,\rho_-\!\left(\frac{\rho_+}{\rho_+}\right)$$

where n is any integer in the half-open interval $$\left[-\frac{N}{2}-\psi,\ +\frac{N}{2}-\psi\right)$$

and $\rho_+$ is the major axis radius vector. In some cases, if the number of sampling points N is even, the offset $\psi$ may be set to $\frac{1}{2}$ such that the sampling points are symmetrically positioned about the middle point of the major axis. For example, if $$\psi=\frac{1}{2},\ N=2\ \text{then}$$

$$n\in\left[-1-\frac{1}{2},\ +1-\frac{1}{2}\right)\Rightarrow n\in[-1,0]\Rightarrow n+\psi=\pm\frac{1}{2}.$$

However, an offset of $\frac{1}{2}$ can also be used for an odd number of samples. For example, if $$\psi=\frac{1}{2},\ N=3\ \text{then}$$

$$n\in\left[-\frac{3}{2}-\frac{1}{2},\ +\frac{3}{2}-\frac{1}{2}\right)\Rightarrow n\in[-2,0]\Rightarrow n+\psi=\left\{\pm\frac{1}{2},-\frac{3}{2}\right\}.$$

It will be evident to a person of skill in the art that this is an example only and that the offset $\psi$ may be set to other suitable values. In particular, if the number of sampling points N is odd, a symmetric distribution of points about the middle or midpoint of the major axis may be attained when $\psi$ is set to 0. For example, if $$\psi=0,\ N=3\ \text{then}\ n\in\left[-\frac{3}{2},+\frac{3}{2}\right)\Rightarrow n\in[-1,1]\Rightarrow n+\psi=\{0,\pm 1\}.$$

However, an offset of 0 can also be used for an even number of samples. For example, if $\psi=0$, N=4, then $n\in[-2,+2)\Rightarrow n\in[-2,1]\Rightarrow n+\psi=\{0,\pm 1,-2\}$.

In yet other examples, the distribution pattern may alternate between offsets of 0 and $\frac{1}{2}$ for odd and even numbers of samples, respectively. However, for the sake of continuity (as the anisotropic ratio increases), it may be preferable to use a consistent offset, which tends to favour an even number of samples since fewer samples may be required when the anisotropic ratio is small (e.g. perhaps only two samples, as opposed to three, when the ratio is close to unity).

In some cases, a single set of equally spaced sampling points along the major axis is identified and the ellipse to be sampled is the elliptical footprint identified in block 402. In these cases, isotropic filtering is performed at each of the identified sampling points (see block 406), and the results of the isotropic filtering are combined using a Gaussian filter (see block 408). In some cases, the isotropic filtering performed at the sampling points may incorporate a mipmap interpolation technique. In such cases, performing isotropic filtering at a sampling point may comprises: performing a first isotropic filtering at the sampling point at a first mipmap level; performing a second isotropic filtering at the sampling point at a second mipmap level; and interpolating between a result of the first isotropic filtering and a result of the second isotropic filtering to generate a result of the isotropic filtering for the sampling point. Therefore, in these cases, the interpolation between mipmaps is performed before the combination (i.e. before block 408). To implement trilinear filtering, the first and second isotropic filtering may be bilinear filtering, the first and second mipmap levels may comprise one higher resolution mipmap level and one lower resolution mipmap level, and the result of the trilinear filtering at each sampling point is combined at block 408.

For example, let the length of the minor axis $\rho_-$ be equal to $\sqrt{2}$ base mipmap level texels, and the length of the major axis $\rho_+$ be equal to $3\sqrt{2}$ base mipmap level texels. As is known to those of skill in the art, the minor and major axis lengths have a fixed size in normalised texture co-ordinates so will have a smaller texel size for lower resolution mipmap levels. In this example, $\eta=3$, and the level of detail (LOD)

$$\lambda=\log_2\rho_-=\frac{1}{2}$$

which indicates that it may be beneficial to sample from multiple mipmaps. Where only one set of equally spaced sampling points along the major axis are identified, N samples (where N is proportional to $\eta=3$) at a spacing of $$\kappa\sqrt{1-\frac{1}{3^2}}\,\rho_-$$

are identified which produces an effective spacing of $$\kappa\sqrt{1-\frac{1}{3^2}}\sqrt{2}$$

texels from the base mipmap level and $$\kappa\sqrt{1-\frac{1}{3^2}}\frac{1}{\sqrt{2}}$$

texels from the second mipmap level. It will be evident to those of skill in the art that these locations are aligned in (u, v) co-ordinates. Thus the relevant positions of each mipmap level can be identified by a single set of points along the major axis.

Figure 6:
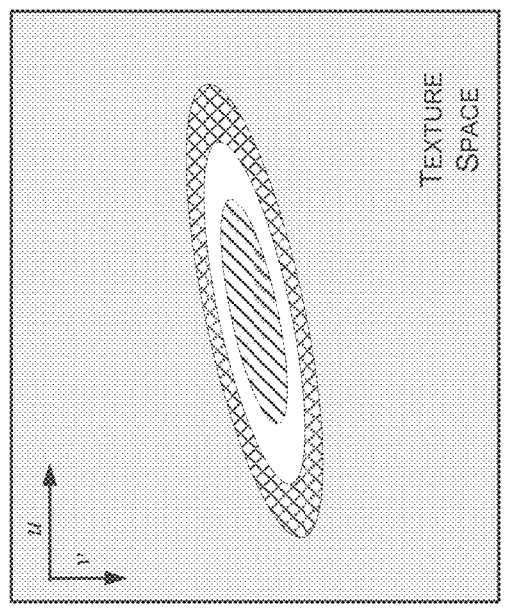
FIG. 6 is a schematic diagram illustrating a symmetric anisotropic texture filtering method in which a desired elliptical footprint is approximated using two concentric ellipses, one smaller than the desired ellipse and one larger than the desired ellipse.
Figure 6:
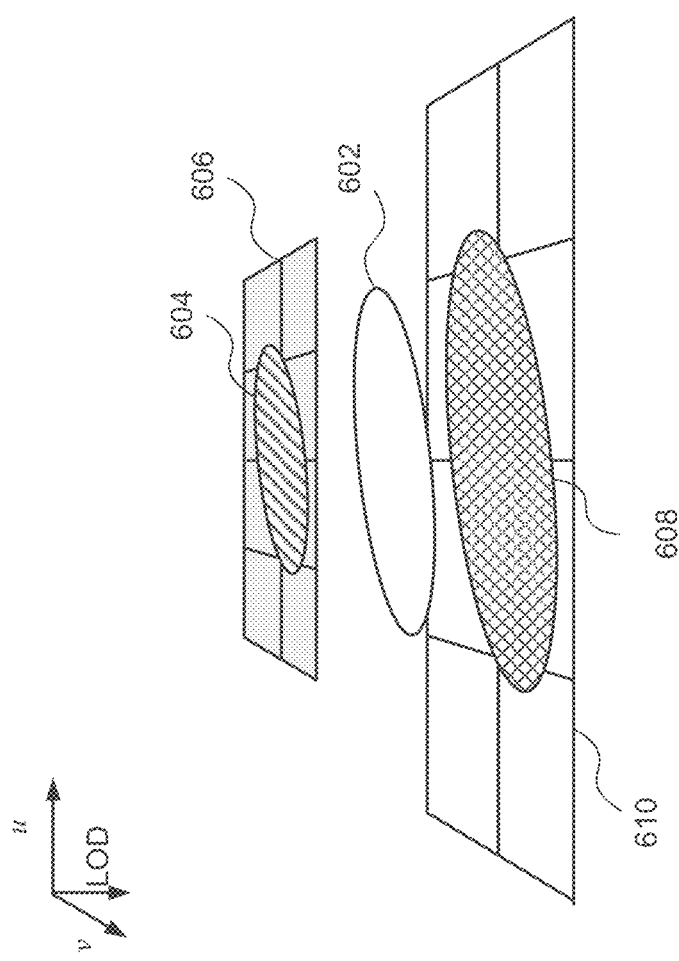

In other cases, where multiple mipmap levels are used, multiple sets of equally spaced sampling points along the major axis are identified—one for each mipmap level. Each set of equally spaced sampling points relates to, or is associated with, a different ellipse to be sampled, wherein each ellipse to be sampled is based on, and/or related to, the elliptical footprint identified in block 402. When multiple sets of sampling points are identified each set may have the same number of sampling points or different sets may have a different number of sampling points.

Where multiple sets of sampling points are identified, isotropic filtering may be performed at each of the identified points of each set (see block 406), the results of the isotropic filtering for each set may be combined separately (see block 408), and then interpolation may be performed on the two combination results (e.g. using a fractional level of detail (LOD) mipmap interpolation weight). For each mipmap level the steps are in units of texels. In some examples, described with reference to FIG. 6, the major axis may be rescaled to be 2η texels to preserve the eccentricity of the ellipse and so that the target ellipse 602 (i.e. the elliptical footprint identified in block 402) is a linear interpolation of an ellipse 604 that is smaller than the target ellipse 602 (from the higher resolution mipmap 606) and an ellipse 608 that is larger than the target ellipse 602 (from the lower resolution mipmap 610), each of which are concentric with respect to the target ellipse 602. Accordingly, the two ellipses to be sampled are the smaller ellipse 604 and the larger ellipse 608. This may be referred to herein as symmetric anisotropic filtering. Since the anisotropic ratio is the same for both ellipses 604, 608 to be sampled the number of samples in each set of sampling points is the same.

For example, let the length of the minor axis $\rho_-$ be equal to $\sqrt{2}$ base mipmap level texels, and the length of the major axis $\rho_+$ be equal to $3\sqrt{2}$ base mipmap level texels. In this example a spacing of $$\kappa\sqrt{1-\frac{1}{3^2}}$$

texels is used for each mipmap level. Since a width of a texel from the second mipmap level is twice that of the first (base) mipmap level, the kernel width of the second mipmap level is double that of the first. As the sample locations do not align, a separate set of sample points is identified for each mipmap level.

Figure 7:
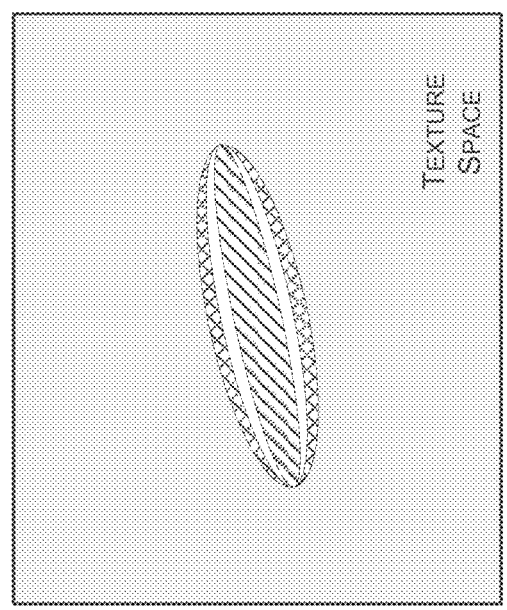
FIG. 7 is a schematic diagram illustrating an asymmetric anisotropic texture filtering method in which a desired elliptical footprint is approximated using two ellipses of differing eccentricity.
Figure 7:
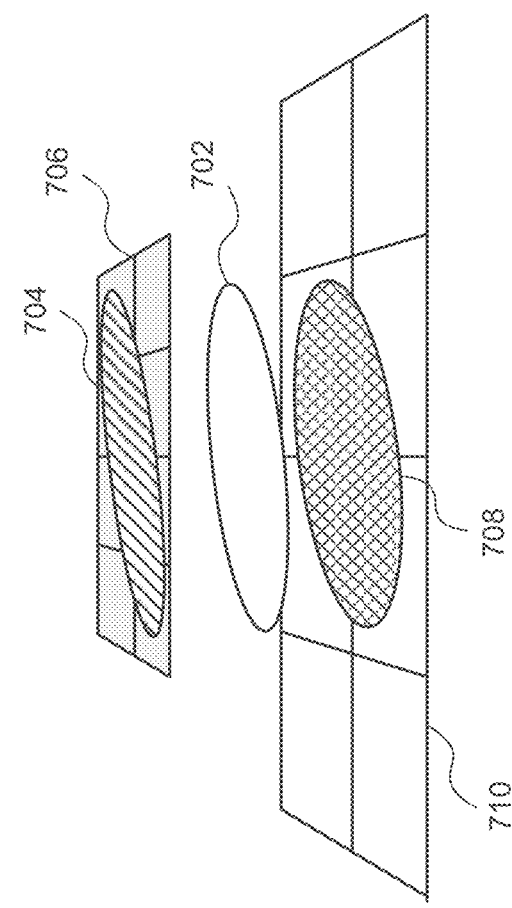

In other examples, described with reference to FIG. 7, the major axis is not rescaled (i.e. it is left unaltered) so that the target ellipse 702 is approximated by a linear interpolation of a higher eccentricity ellipse 704 with respect to the target ellipse 702 (from the higher resolution mipmap 706) and a lower eccentricity ellipse 708 with respect to the target ellipse 702 (from the lower resolution mipmap 710). Accordingly, the two ellipses to be sampled are the higher eccentricity ellipse 704 and the lower eccentricity ellipse 708. This may be referred to herein as asymmetric anisotropic filtering. Since the anisotropic ratio of the two ellipses 704, 708 to be sampled is different, the number of samples in each set of sampling points may be different. Generally, the set of sampling points for the higher resolution mipmap 706 will have twice as many sampling points as the set of sampling point for the lower resolution mipmap 719. In these cases, if there is a ratio less than 2 on the higher resolution mipmap this may be clamped to a minimum ratio of 1 on the lower resolution mipmap level (so it still overblurs in the lower ratio limit).

For example, let the length of the minor axis $\rho_-$ be equal to $\sqrt{2}$ base mipmap level texels, and the length of the major axis $\rho_+$ be equal to $3\sqrt{2}$ base mipmap level texels. In this example $$\eta_{hi} = \frac{\rho_+}{\text{base } mipmap \text{ level } texel} = 3\sqrt{2} \text{ and}$$

$$\eta_{lo} = \frac{\rho_+}{\text{second } mipmap \text{ leveltexel}} = \frac{3}{\sqrt{2}}.$$

The spacing for the higher resolution mipmap level is $$\kappa\sqrt{1-\frac{1}{2\cdot 3^2}}$$

texels and the spacing for the lower resolution mipmap level is $$\kappa\sqrt{1-\frac{2}{3^2}}$$

texels. As the sample locations do not align, a separate set of sample points is identified for each mipmap level.

Once the sampling point set(s) have been identified the method 400 proceeds to block 406.

At block 406, isotropic filtering is performed at each of the sampling points identified in block 404 (e.g. isotropic filtering 508 may be performed at each of the sampling points 506 in FIG. 5). The isotropic filtering performed at a sampling point may be any type of isotropic filtering such as, but not limited to, point filtering, bilinear filtering (with or without mipmapping) and trilinear filtering. In general, the closer, or more similar, the isotropic filter is to a Gaussian filter, the better the results of the method 400 of FIG. 4. For example, a tent filter is more similar to a Gaussian filter than a box filter thus performing the isotropic filtering using a tent filter may improve the result of the anisotropic filtering. Specifically, the box filter is the first order cardinal B-spline, and the tent filter is the second order cardinal B-spline, formed by convolving the box filter by itself. The central limit theorem indicates that if one applied repeated convolution of these filters (i.e. distributions), they tend towards the normal distribution, so the cardinal B-splines can be seen as a series of increasing order approximations of the Gaussian. In general, higher order B-splines have better anti-aliasing properties and thus may produce better results. Once isotropic filtering has been performed at each of the sampling points, the method 400 proceeds to block 408.

At block 408, the isotropic filtering results for each set of sampling points are combined used a Gaussian kernel. For example, where there is a single set of sampling points, the isotropic filtering results for those sampling points are combined using a Gaussian kernel. Where, however, there are multiple sets of sampling points—one corresponding to each mipmap level, then the isotropic filtering results corresponding to each mipmap level may be combined separately using a Gaussian kernel. Specifically, the isotropic filtering results corresponding to the lower resolution mipmap level may be combined using a Gaussian kernel, and the isotropic filtering results corresponding to the higher resolution mipmap level may be combined using a Gaussian kernel.

In some cases, the results of the isotropic filtering for a set of sampling points may be combined by identifying the appropriate Gaussian weight for each isotropic filtering result based on the location of the related sampling point, calculating the product of each filtering result and the corresponding weight, and calculating the sum of the products. However, as described in more detail below with respect to FIG. 8, in other cases the results of the isotropic filtering for a set of sampling points may be combined via recursive linear interpolation.

Where only one set of sampling points were identified, then the method 400 may end. Where, however, multiple sets of sampling points were identified then the method 400 may proceed to block 410.

At block 410, it is interpolated between the combination results generated in block 408 for the different sets of sampling points. For example, block 410 may comprise interpolating between the Gaussian combination result generated in block 408 for the set of sampling points for a higher resolution mipmap and the Gaussian combination result generated in block 408 for the set of sampling points for a lower resolution mipmap. In some cases, the interpolation may be performed using a fractional level of detail (LOD) mipmap interpolation weight. However, it will be evident to a person of skill in the art that this is an example only. Once the interpolation has been performed, the method 400 may end. The result of the method (block 408 or block 410), which may be referred to as a filter result, may be output for further processing. For example, the output of the method (block 408 or block 410) may be output to a shader (or another component of a graphics processing unit or a graphics processing system) for use in generating a rendering output (e.g. an image).

The different approaches described above for using multiple mipmap levels have different advantages and disadvantages. Where the interpolation between isotropic filtering results for different mipmap levels is performed prior to combining the filtering results (e.g. where a single set of sampling points are identified), the sampling points along the major axis may be spaced too sparsely on the high resolution mipmap and too densely on the low resolution mipmap, which may result in a relatively poor and high quality approximation respectively, in terms of the minor axis scale. In contrast, if the interpolation between isotropic filtering results for different mipmap levels is performed after Gaussian combination of the filtering results (e.g. where a set of sampling points are identified for each mipmap level) there will be a consistent spacing on each mipmap, so the quality in terms of the kernel sample density (i.e. minor axis spacing) will be consistent. However, if the symmetric anisotropic filtering approach is used where a pair of concentric ellipses are used to approximate the desired ellipse (one smaller than the desired ellipse and one larger than the desired ellipse), the kernel major axis length may be too sparsely separated (between adjacent fragments in the gram buffer) on the high resolution mipmap level and too densely separated on the lower resolution level. This is because using a pair of different sized ellipses affects the degree of overlap with neighbouring fragments. In contrast, if the asymmetric anisotropic filtering is used where a pair of ellipses with different levels of eccentricity are used to approximate the desired ellipse, then for the major axes the desired filter width is selected for each mipmap level and therefore the antialiasing issue associated with linearly interpolating two different sized kernels is avoided.

Spacing of the Sampling Points Along the Major Axis

In Gaussian EWA a circular Gaussian filter in screen space is mapped to an elliptical filter in texture space. In the methods described herein the continuous Gaussian filter of Gaussian EWA is approximated as a discrete Gaussian weighted sum of smaller filters (i.e. the isotropic filters which are preferably Gaussian filters) which can be represented as a convolution between a Gaussian filter and an isotropic filter.

In determining a preferred spacing of the sampling points one must first identify the preferred covariance of the convolution and the filters that make up the convolution. As will be described in more detail below, the inventors have identified that the preferred variance of the convolution is $\rho_+^2$, and the preferred variance of the isotropic filter is $\rho_-^2$, and since the variances of functions are additive under convolution the preferred variance of the Gaussian filter is $\rho_+^2 - \rho_-^2$. Methods known to the Applicant for estimating forms of EWA (e.g. Gaussian EWA), which is not an admission that they are well-known, do not generally account for the contribution of the isotropic filter to the target variance, leading to inexact resultant kernel profiles.

Specifically, in anisotropic filtering preferably there is a symmetric covariance matrix in screen space which maps to an anisotropic covariance matrix in texture space. In some examples, an asymmetric covariance matrix in space may be defined, but this generates additional complexity in the determination of the elliptical footprint in textures space. Equation (10) shows a 2D mapping of a covariance matrix $(\overline{xx^T})$ in screen space to an anisotropic covariance matrix (J $\overline{xx^T}J^T$) using the total derivative or Jacobian (J) (typically formed from the screen-space coordinate derivatives, as described above) as an affine mapping approximation. In particular, if the covariance matrix is symmetric $$\left(\text{e.g. } \overline{xx^T} = \begin{pmatrix} 1 & 0 \\ 0 & 1 \end{pmatrix}\right)$$

the determination of the mapping simplifies to the earlier equations (e.g. $J\overline{xx^T}J^T = JJ^T$). It can be seen that this describes an ellipse with a major axis $$\rho_+ \begin{pmatrix} \cos\phi \\ \sin\phi \end{pmatrix}$$

and a minor axis $$\rho_-\begin{pmatrix}-\sin\phi\\ \cos\phi\end{pmatrix},$$

where for texture space coordinates $$\begin{pmatrix}u\\v\end{pmatrix},$$

$\phi$ describes the angular displacement of the major axis from the u axis in texture space.

$$\overline{xx^T} \mapsto \overline{Jxx^TJ^T} = \begin{pmatrix}\cos\phi & -\sin\phi\\ \sin\phi & \cos\phi\end{pmatrix}\begin{pmatrix}\rho_+^2 & 0\\ 0 & \rho_-^2\end{pmatrix}\begin{pmatrix}\cos\phi & \sin\phi\\ -\sin\phi & \cos\phi\end{pmatrix} \quad (10)$$

This can be divided into an isotropic portion and anisotropic portion. Specifically, let the anisotropic filter be represented by A and the isotropic filter be represented as T then, using the additive property of covariance where the covariance of a filter F is written as $\overline{xx^T}(F)$, equation (10) can be re-written as equation (11) which can be re-written as equation (12) where $\rho_A^2$ is proportional to the variance of the anisotropic filter A along the axis $$\begin{pmatrix}\cos\theta\\ \sin\theta\end{pmatrix} \text{ and } \rho_T^2$$

is proportional to the covariance of the isotropic filter T (which is along both the major axis and the minor axis). It can be seen from equation (12) that the covariances along the major axis are additive to produce a final variance for the convolution of $\rho_A^2+\rho_T^2$.

$$\overline{xx^T}(A*T) = \overline{xx^T}(A) + \overline{xx^T}(T) \quad (11)$$

$$= \begin{pmatrix}\cos\theta & -\sin\theta\\ \sin\theta & \cos\theta\end{pmatrix}\begin{pmatrix}\rho_A^2 & 0\\ 0 & 0\end{pmatrix}\begin{pmatrix}\cos\theta & \sin\theta\\ -\sin\theta & \cos\theta\end{pmatrix} + \begin{pmatrix}\rho_T^2 & 0\\ 0 & \rho_T^2\end{pmatrix}$$

$$= \begin{pmatrix}\cos\theta & -\sin\theta\\ \sin\theta & \cos\theta\end{pmatrix}\begin{pmatrix}\rho_A^2+\rho_T^2 & 0\\ 0 & \rho_T^2\end{pmatrix}\begin{pmatrix}\cos\theta & \sin\theta\\ -\sin\theta & \cos\theta\end{pmatrix} \quad (12)$$

Preferably equation (12) is equal to equation (10). In other words, preferably the covariance of the convolution is equal to the preferred covariance expressed in equation (10). For equation (10) and (12) to be equal, then $\phi=\theta$, $\rho_T^2=\rho_-^2$, and $\rho_A^2=\rho_+^2-\rho_-^2$. Therefore the preferred covariance for the anisotropic filter is $\rho_+^2-\rho_-^2$. Accordingly, in determining the covariance of the anisotropic filter, the covariance of the isotropic filter is to be taken into account.

Now that the preferred covariance of the Gaussian filter (i.e. the anisotropic filter) has been determined to be $\rho_+^2-\rho_-^2$, an analysis of the error is used to identify a preferred spacing of the sample points along the major axis. Specifically, as the discrete weighted sum is only an approximation of a continuous Gaussian there will be an error between the continuous Gaussian and the discrete approximation thereof. The inventors have identified that the upper bound on this error is not dependent on the anisotropic ratio if the spacing between the samples is proportional to $\sqrt{1-\eta^{-2}}$ units. This is advantageous because, when the error is not dependent on the anisotropic ratio, a consistent quality can be achieved for a given (kernel) sampling rate budget. Specifically, when the error is not dependent on the anisotropic ratio it can be seen that if the number of samples are reduced for lower ratios this will result in a greater error. In other words, one cannot cut corners for lower anisotropic ratios.

Specifically, let a discrete Gaussian weighted sum $\tilde{\Gamma}(x)$ with the preferred covariance of $\rho_+^2-\rho_-^2$ be represented in 1 dimension as shown in equation (13), wherein $\psi$ is the offset from the centre of the major axis of the ellipse at which the first sample is situated, $\sigma$ is the distance between samples along the major axis, and $\delta$ is the Dirac delta function, used to reduce a convolution defined inside an integral to a discrete sum. As described above, in some cases the offset $\psi$ is equal to ½ such that when there are an even number of samples the samples are evenly distributed on either side of the middle or centre point of the major axis (i.e. the samples are symmetric about the middle or centre of the major axis). However, in other cases, the offset $\psi$ may be other values such as, but not limited to, zero.

$$\tilde{\Gamma}(x) = \sqrt{\frac{2\sigma^2}{\pi(\rho_+^2-\rho_-^2)}}\sum_{n\in\mathbb{Z}}e^{-2\left(\frac{x}{\sqrt{1-\eta^{-2}}\rho_+}\right)^2}\delta(x-(n+\psi)\sigma) \quad (13)$$

The Gaussian weighted sum is convolved with the isotropic filter. Let the isotropic filter be a Gaussian filter with a covariance of $\rho_-^2$ as shown in equation (14), which is the preferred covariance for the isotropic filter.

$$\Gamma_{\rho_-^2}(x) = \sqrt{\frac{2}{\pi\rho_-^2}}e^{-\frac{2x^2}{\rho_-^2}} \quad (14)$$

The general form of the convolution can then be expressed by equation (15) which can be re-written as equation (16) by using the Dirac delta function $\delta$ to eliminate the convolution such that the convolution can be written as a sum of smaller Gaussians at each sample location weighted by the discrete Gaussian filter $\tilde{\Gamma}$. Specifically, the result of the application of the Dirac delta function $\delta$ in the integral is only non-zero when $x'=x-(n+\psi)\sigma$, therefore $x'$ is replaced with $x-(n+\psi)\sigma$ and the integral is removed.

$$\left(\tilde{\Gamma}*\Gamma_{\rho_-^2}\right)(x) = \sqrt{\frac{2\sigma^2}{\pi(1-\eta^{-2})\rho_+^2}}\sqrt{\frac{2}{\pi\rho_-^2}}\int dx' \sum_{n\in\mathbb{Z}} e^{-2\left(\frac{x-x'}{\sqrt{1-\eta^{-2}}\rho_+}\right)^2} \quad (15)$$

$$\delta(x-x'-(n+\psi)\sigma)e^{-\frac{2x'^2}{\rho_-^2}}$$

$$= \sqrt{\frac{2\sigma^2}{\pi(1-\eta^{-2})\rho_+^2}}\sqrt{\frac{2}{\pi\rho_-^2}}\sum_{n\in\mathbb{Z}}\exp\left(-2\left(\frac{(n+\psi)\sigma}{\sqrt{1-\eta^{-2}}\rho_+}\right)^2\right) \quad (16)$$

$$\exp\left(-2\left(\frac{x-(n+\psi)\sigma}{\rho_-}\right)^2\right)$$

The exponents in equation (16) can then be arranged as shown below to result in a representation of the exponents shown in equation (17) wherein the exponents are expressed as the combination of two terms—a first term which is dependent on n and a second term which is not dependent on n. It can be seen that this rearranging has been accomplished by completing the square.

$$-2\left(\frac{(n+\psi)\sigma}{\sqrt{1-\eta^{-2}}\rho_+}\right)^2 - 2\left(\frac{x-(n+\psi)\sigma}{\rho_-}\right)^2 = -2\left[\left(\frac{1}{(1-\eta^{-2})\rho_+^2} + \frac{1}{\rho_-^2}\right)\sigma^2(n+\psi)^2 - \frac{1}{\rho_-^2}2x\sigma(n+\psi) + \left(\frac{x}{\rho_-}\right)^2\right] \quad (17)$$

$$= -2\left[\left(\frac{1}{(1-\eta^{-2})\rho_-^2}\right)\sigma^2(n+\psi)^2 - \left(\frac{1}{(1-\eta^{-2})\rho_-^2}\right)2(1-\eta^{-2})x\sigma(n+\psi) + \right.$$

$$\left.\left(\frac{1}{(1-\eta^{-2})\rho_-^2}\right)(1-\eta^{-2})^2 x^2 - \left(\frac{1}{(1-\eta^{-2})\rho_-^2}\right)(1-\eta^{-2})^2 x^2 + \left(\frac{x}{\rho_-}\right)^2\right]$$

$$= -\left(\frac{2}{(1-\eta^{-2})\rho_-^2}\right)(\sigma(n+\psi) - (1-\eta^{-2})x)^2 - \frac{2(\eta^{-2}-1+1)}{\rho_-^2}x^2$$

$$= -2\left(\frac{\sigma(n+\psi) - (1-\eta^{-2})x}{\sqrt{1-\eta^{-2}}\rho_-}\right)^2 - 2\left(\frac{x}{\rho_+}\right)^2$$

The exponents in equation (16) can then be replaced with the expression thereof in equation (17) which results in equation (18). Since the second term of equation (17) is not dependent on n it can be removed from the summation which results in equation (19). It can be seen that the terms outside of the summation represent a Gaussian filter with a variance of $\rho_+^2$. Thus equation (19) can be re-written as a function of a Gaussian filter with a variance of $\rho_+^2$ (i.e. $\Gamma_{\rho_+^2}(x)$) a shown in equation (20)

$$\left(\tilde{\Gamma} * \Gamma_{\rho_-^2}\right)(x) = \sqrt{\frac{2\sigma^2}{\pi(1-\eta^{-2})\rho_+^2}} \sqrt{\frac{2}{\pi\rho_-^2}} \sum_{n\in\mathbb{Z}} \exp\left(-2\left(\frac{\sigma(n+\psi) - (1-\eta^{-2})x}{\sqrt{1-\eta^{-2}}\rho_-}\right)^2\right)\exp\left(-2\left(\frac{x}{\rho_+}\right)^2\right) \quad (18)$$

$$= \left[\sqrt{\frac{2}{\pi\rho_+^2}}\exp\left(-2\left(\frac{x}{\rho_+}\right)^2\right)\right]\left[\sqrt{\frac{2\sigma^2}{\pi(1-\eta^{-2})\rho_-^2}} \sum_{n\in\mathbb{Z}}\exp\left(-2\left(\frac{(n+\psi)-\sigma^{-1}(1-\eta^{-2})x}{\sigma^{-1}\sqrt{1-\eta^{-2}}\rho_-}\right)^2\right)\right] \quad (19)$$

$$= \Gamma_{\rho_+^2}(x)\left[\sqrt{\frac{2\sigma^2}{\pi(1-\eta^{-2})\rho_-^2}} \sum_{n\in\mathbb{Z}}\exp\left(-2\left(\frac{(n+\psi)-\sigma^{-1}(1-\eta^{-2})x}{\sigma^{-1}\sqrt{1-\eta^{-2}}\rho_-}\right)^2\right)\right] \quad (20)$$

A Gaussian filter with a variance of $\rho_+^2$ (i.e. $\Gamma_{\rho_+^2}(x)$) is the desired result of the convolution thus it is desirable for the terms within the bracket of equation (20) to be as close to one as possible. Equation (20) can be further simplified by using a Fourier transform of a Gaussian to itself as expressed in equation (21). It can be seen from equation (21) that the Fourier transform of a Gaussian is a Gaussian. It can be seen that equation (21) is generated by completing the square and the fact that $$\int_{-\infty}^{\infty} dx\, e^{-ax^2} = \sqrt{\frac{\pi}{a}}.$$

$$\int_{-\infty}^{\infty} dk\, e^{-\frac{1}{2}(\pi\rho k)^2} e^{2\pi i k x} = \int_{-\infty}^{\infty} dk\exp\left(-\frac{(\pi\rho)^2}{2}\left(k - 2i\frac{x}{\pi\rho^2}\right)^2 - 2\left(\frac{x}{\rho}\right)^2\right) \quad (21)$$

$$= e^{-2\left(\frac{x}{\rho}\right)^2} \int_{-\infty}^{\infty} dk\exp\left(-\frac{(\pi\rho)^2}{2}\left(k - 2i\frac{x}{\pi\rho^2}\right)^2\right)$$

$$= \sqrt{\frac{2}{\pi\rho^2}} e^{-2\left(\frac{x}{\rho}\right)^2}$$

If $\rho = \sigma^{-1}\sqrt{1-\eta^{-2}}\rho_-$ then equation (21) can be re-written as equation (22).

$$\sqrt{\frac{2\sigma^2}{\pi(1-\eta^{-2})\rho_-^2}} e^{-2\left(\frac{x}{\sigma^{-1}\sqrt{1-\eta^{-2}}\rho_-}\right)^2} = \int_{-\infty}^{\infty} dk\, e^{-\frac{1}{2}\left(\pi\sigma^{-1}\sqrt{1-\eta^{-2}}\rho_- k\right)^2} e^{2\pi i k x} \quad (22)$$

Equation (20) can then be re-written as equation (23) using equation (22).

$$\left(\tilde{\Gamma} * \Gamma_{\rho_-^2}\right)(x) = \Gamma_{\rho_+^2}(x)\sum_{n\in\mathbb{Z}}\int_{-\infty}^{\infty} dk \exp \quad (23)$$

$$\left(-\frac{1}{2\sigma^2}(1-\eta^{-2})(\pi\rho_- k)^2\right)\exp\left(2\pi i k((n+\psi) - \sigma^{-1}(1-\eta^{-2})x)\right)$$

Using the identity $\sum_{n\in\mathbb{Z}} \exp(2\pi i k n) = \sum_{n\in\mathbb{Z}} \delta(n-k)$, which specifies that a discrete series of integer frequency sinusoidal functions is equivalent to a train of Dirac delta functions with integer spacing, equation (23) can be re-written as equation (24) which can be simplified to equation (25) because the integral with respect to the Dirac delta function $\delta$ selects the integrand at integer locations.

$$(\hat{\Gamma} * \Gamma_{\rho_-^2})(x) = \Gamma_{\rho_+^2}(x) \sum_{n \in \mathbb{Z}} \int_{-\infty}^{\infty} dk \delta(n-k) \exp\left(-\frac{1}{2\sigma^2}(1-\eta^{-2})(\pi\rho_- k)^2\right) \exp\left(2\pi i k(\psi - \sigma^{-1}(1-\eta^{-2})x)\right) \quad (24)$$

$$= \Gamma_{\rho_+^2}(x) \sum_{n \in \mathbb{Z}} \exp\left(-\frac{1}{2\sigma^2}(1-\eta^{-2})(\pi\rho_- n)^2\right) \exp\left(2\pi i n(\psi - \sigma^{-1}(1-\eta^{-2})x)\right) \quad (25)$$

One way to determine the worst case error on an operator like a kernel is to use the supremum norm when the kernel K acts on some function $f$ (which is a texture in the anisotropic filtering case). The supremum norm can be expressed by equation (26), and the L1 norm can thus be expressed by equation (27).

$$\|K * f\|_\infty = \sup_{x \in \mathbb{R}} \left| \int_{-\infty}^{\infty} dx' K(x-x') f(x') \right| \leq \sup_{x \in \mathbb{R}} |f(x)| \int_{-\infty}^{\infty} dx' |K(x')| = \|K\|_1 \|f\|_\infty \quad (26)$$

$$\|K\|_1 = \int_{-\infty}^{\infty} dx |K(x)| \quad (27)$$

The error between the continuous desired Gaussian $\Gamma_{\rho_+^2}$ and the convolution can thus be expressed as the L1 norm as shown in equation (28). Equation (28) can be re-written as equation (29) using equation (25). It can be seen that the summation has been reduced to positive integers n only. The upper bound on the error can thus be expressed by equation (30) because the integral of a Gaussian ($\int_{-\infty}^{\infty} dx \, \Gamma_{\rho_+^2}(x)$) is one and the upper bound on the cosine is 1.

$$\left\| \hat{\Gamma} * \Gamma_{\rho_-^2} - \Gamma_{\rho_+^2} \right\|_1 = \int_{-\infty}^{\infty} dx \left| (\hat{\Gamma} * \Gamma_{\rho_-^2})(x) - \Gamma_{\rho_+^2}(x) \right| \quad (28)$$

$$= \int_{-\infty}^{\infty} dx \Gamma_{\rho_+^2}(x) \left| \sum_{n \in \mathbb{N}} 2\exp\left(-\frac{1}{2\sigma^2}(1-\eta^{-2})(\pi\rho_- n)^2\right) \cos(2\pi i n(\psi - \sigma^{-1}(1-\eta^{-2})x)) \right| \leq \quad (29)$$

$$\sum_{n \in \mathbb{N}} 2\exp\left(-\frac{1}{2\sigma^2}(1-\eta^{-2})(\pi\rho_- n)^2\right) \quad (30)$$

It can be seen from equation (30) that if the spacing $\sigma$ of the samples along the major axis is proportional to $\sqrt{1-\eta^{-2}}$ units (i.e. $\rho_-$ in this example) as shown in equation (31) where $\kappa$ is some constant, then the upper bound on the error shown in equation (30) can be expressed as shown in equation (32).

$$\sigma = \kappa \sqrt{1-\eta^{-2}} \rho_- \quad (31)$$

$$\left\| \hat{\Gamma} * \Gamma_{\rho_-^2} - \Gamma_{\rho_+^2} \right\|_1 \leq \sum_{n \in \mathbb{N}} 2\exp\left(-\frac{(\pi n)^2}{2\kappa^2}\right) \quad (32)$$

It can thus be seen from equation (32) that when the spacing $\sigma$ of the samples along the major axis is proportional to $\sqrt{1-\eta^{-2}}$ units then the upper bound on the error is not dependent on the ratio $\eta$ or the units (e.g. $\rho_-$ in this example) which is beneficial. Specifically, it allows there to be a uniform bound for a set of parameters.

It has been assumed in the above analysis that an infinite series of weights are applied in the discrete convolution, which is clearly not feasible. This error is treated herein as an independent parameter that, as described in more detail below, can be controlled by the extent of the kernel support.

Two different example implementations where the spacing $\sigma$ of the samples along the major axis is proportional to $\sqrt{1-\eta^{-2}}$ units will now be described. As is known to those of skill in the art, for a non-negative function such as a Gaussian function, the variance (or rather the standard deviation, i.e. the square root of the variance) gives an indication of the scale of the kernel and the degrees of filtering. Accordingly, if the anisotropic filter has the preferred variance of $\rho_+^2 - \rho_-^2$ then the standard deviation of the filter is $\sqrt{\rho_+^2 - \rho_-^2}$. Since the Gaussian (discrete or continuous) has infinite support, the series is truncated to generate a finite sequence of filtering operations. While higher quality windowing functions can be selected, the examples here assume a simple termination of the series after a finite number of terms.

It is desirable that the support of the Gaussian kernel along the major axis (i.e. the length of the major axis over which the sample points extend) be proportional, by a proportionality factor $\alpha$, of two standard deviations (i.e. 2 $\sqrt{\rho_+^2 - \rho_-^2}$). If there are N evenly spaced samples along the major axis then the spacing or distance $\sigma$ between the samples on the major access can be expressed as shown in equation (33), where $\rho_-$ is the minor radius vector and $\rho_+$ is the major radius vector. Accordingly, $2\alpha$ represents the number of standard deviations of the major axis that is covered by the samples. Equation (33) can then be expressed in terms of $\sqrt{1-\eta^{-2}}$ as shown in equations (34) and (35).

$$\sigma = \left(\frac{2\alpha}{N}\right) \sqrt{\rho_+^2 - \rho_-^2} \left(\frac{\rho_-}{\rho_-}\right) \quad (33)$$

$$\sigma = \left(\frac{2\alpha\eta}{N}\right) \sqrt{1-\eta^{-2}} \rho_- \left(\frac{\rho_+}{\rho_+}\right) \quad (34)$$

$$\sigma = \left(\frac{2\alpha\eta}{N}\right) \sqrt{1-\eta^{-2}} \rho_+ \quad (35)$$

In a first example implementation, N (which has to be an integer) is proportional to the anisotropic ratio $\eta$, a sampling rate $\beta$, and the width of the kernel in standard deviations (i.e. $2\alpha$) as shown in equation (36). In general, a is a parameter that controls the width of the kernel. In some cases, a is an integer. In general, the sampling rate is a parameter that controls how closely spaced along the major axis kernel the samples are. The higher $\beta$ is, the more closely spaced the samples are along the major axis. For example, if $\beta$ is two, samples are taken every one standard deviation of the minor axis, instead of every two standard deviations of the minor axis when $\beta$ is one. In some cases, $\beta$ is an integer. $\beta$ may be one. One or more of the parameters $\alpha$ and $\beta$ may be manually or dynamically selected based on a sampling budget and/or a desired level of quality. In this example, the spacing σ between the sample points can be expressed by equation (37) by replacing N in equation (34) with the right-hand side of equation (36).

$$N = 2\alpha\beta\lceil\eta\rceil \quad (36)$$

$$\sigma = \frac{1}{\beta}\frac{\eta}{\lceil\eta\rceil}\sqrt{1-\eta^{-2}}\,\rho_-\left(\frac{\rho_+}{\rho_+}\right) \quad (37)$$

Accordingly, the proportionality factor κ is equal to $$\frac{1}{\beta}\frac{\eta}{\lceil\eta\rceil}$$

for this first example implementation. It can be seen from the inequality in equation (32) that the cap on the error in the approximation decreases as β increases. This indicates that the approximation quality, in the limit as a tends toward infinity, is highest when η is just larger than an integer. Specifically, it can be seen from equation (37) that when the anisotropic ratio η is an integer (i.e. η=⌈η⌉) the spacing σ of the samples along the major axis (in units of $\rho_-$) is proportional, by a constant or fixed proportionality factor of $$\frac{1}{\beta},$$

to $\sqrt{1-\eta^{-2}}$. When the anisotropic ratio η is not an integer ((i.e. η≠⌈η⌉) then the spacing σ of the samples along the major axis (in units of $\rho_-$) is proportional, by the variable factor $$\frac{1}{\beta}\frac{\eta}{\lceil\eta\rceil}, \text{ to } \sqrt{1-\eta^{-2}}.$$

This means that the sample spacing for non-integer anisotropic ratios is at least as dense as for the corresponding integer anisotropic ratio.

As described above, in the methods described herein, isotropic filtering is performed at the sampling points along the major axis, and the results of the isotropic filtering are combined via a weighted sum where the weights are determined in accordance with a Gaussian kernel. This can be represented as a convolution of an anisotropic filter (a discrete Gaussian weighted sum) and an isotropic filter. The anisotropic filter can be represented by equation (13) shown above. From equation (13) it can be determined that the weight for the result of the isotropic filtering performed for the $n^{th}$ sample point can be determined in accordance with equation (38), where ψ is an offset from the midpoint of the major axis at which the first sample is situated, and σ is the spacing between samples. In some cases, the offset may be set to ½. However, in other cases, the offset may be set to other values, such as, but not limited to, zero. (n+ψ)σ can be expressed as shown in equation (39). If (n+ψ)σ in equation (38) is replaced with the right-hand side of equation (39), equation (38) can be written as equation (40). Equation (40) can be rearranged to produce equation (41).

$$\hat{\Gamma}(n) \propto e^{-2\left(\frac{(n+\psi)\sigma}{\sqrt{1-\eta^{-2}}\rho_+}\right)^2} \quad (38)$$

$$(n+\psi)\sigma = (n+\psi)\left(\frac{2\alpha\eta}{N}\right)\sqrt{1-\eta^{-2}}\,\rho_-\left(\frac{\rho_+}{\rho_+}\right) \quad (39)$$

$$\hat{\Gamma}(n) \propto e^{-2\left(\frac{(n+\psi)\left(\frac{2\alpha\eta}{N}\right)\sqrt{1-\eta^{-2}}\rho_-}{\sqrt{1-\eta^{-2}}\rho_+}\right)^2} = e^{-2\alpha^2\left(\frac{2n+2\psi}{N}\right)^2} \quad (40)$$

$$\hat{\Gamma}(n) = \frac{e^{-2\alpha^2\left(\frac{2n+2\psi}{N}\right)^2}}{\sum_{m\in\left[-\frac{N}{2}-\psi,+\frac{N}{2}-\psi\right]}e^{-2\alpha^2\left(\frac{2m+2\psi}{N}\right)^2}} \quad (41)$$

In this first example, N is as set forth in equation (36) which means equation (41) can be re-written as weights equation (42).

$$\hat{\Gamma}(n) = \frac{e^{-\frac{1}{2}\left(\frac{2n+1}{\beta\lceil\eta\rceil}\right)^2}}{\sum_{m\in\left[-\frac{N}{2}-\psi,+\frac{N}{2}-\psi\right]}e^{-\frac{1}{2}\left(\frac{2m+1}{\beta\lceil\eta\rceil}\right)^2}} \quad (42)$$

It can be seen from equation (42) that in this first example the weights only need to be calculated for integer values of the anisotropic ratio. This can reduce the cost (e.g. tabulation of weights) of implementing this first example. However, the disadvantage of this first example is that the spacing is discontinuous and specifically may jump discontinuously when there is a jump from one integer anisotropic ratio to another. This is especially true if the reconstruction quality is low (for example if the sample rate is low, $$\text{e.g. } \beta = \frac{1}{2})$$

which may result in discontinuous jumps in a filtered image, which may be prominent.

Accordingly, in a second example implementation, to avoid the discontinuous spacing, the anisotropic filter support (as indicated by a) can be widened for non-integer ratios. Specifically, in this second example α is expressed as a function of the anisotropic ratio η as shown in equation (43) where $\alpha_0$ is an integer, representing the base proportionality factor of the kernel support (i.e. multiples of two standard deviations). N can then be written as shown in equation (44) and the spacing σ between the sample points can be expressed by equation (45) by replacing a in equation (34) with the right hand side of equation (43), and replacing N in equation (34) with the right-hand side of equation (44).

$$\alpha(\eta) = \alpha_0\frac{\lceil\eta\rceil}{\eta} \quad (43)$$

$$N = 2\alpha_0\beta\lceil\eta\rceil \quad (44)$$

$$\sigma = \left(\frac{2\alpha\eta}{N}\right)\sqrt{1-\eta^{-2}}\,\rho_-\left(\frac{\rho_+}{\rho_+}\right) = \quad (45)$$

$$\left(\frac{2\alpha_0\lceil\eta\rceil}{N}\right)\sqrt{1-\eta^{-2}}\,\rho_-\left(\frac{\rho_+}{\rho_+}\right) = \frac{1}{\beta}\sqrt{1-\eta^{-2}}\,\rho_-\left(\frac{\rho_+}{\rho_+}\right)$$

In this second example, the spacing of the samples (in units of $\rho_-$) is always proportional, by a fixed or constant proportionality constant $\frac{1}{\beta}$, to $\sqrt{1-\eta^{-2}}$ regardless or whether the anisotropic ratio is an integer or not.

In this second example N is as set forth in equation (44) which means equation (41) can be re-written as equation (46).

$$\tilde{\Gamma}(n) = \frac{e^{-\frac{1}{2}\left(\frac{2n+1}{\beta\eta}\right)^2}}{\sum_{m\in\left[-\frac{N}{2}-\psi, +\frac{N}{2}-\psi\right]} e^{-\frac{1}{2}\left(\frac{2m+1}{\beta\eta}\right)^2}} \quad (46)$$

It can be seen from equation (46) that in this second example the weights are not limited to integer anisotropic ratios which makes calculation and storage of the weights more complicated, but this second example has the advantage that the spacing is continuous for various ratios and gives a uniform error in the limit as the number of samples tends to infinity.

It is noted that the first and second example formulations of the spacing of the sample points and the corresponding weights end up being the same for integer anisotropic ratios. Furthermore, if a in the first example equals $\alpha_0$ in the second example, an identical number of samples is used in each example, irrespective of the anisotropic ratio. In the former case, the sample density is increased, and the kernel support (in terms of standard deviations) is held constant, yielding an increased sample density quality of approximation but with roughly constant error associated with the truncation of the series. In the latter case, the sample density is held constant, but the kernel support is increased, reducing the error associated with the truncation of the series, but, as noted above, this effect diminishes as the base kernel support increases and vanishes in the limit.

Recursive Linear Interpolation

The methods of performing anisotropic filtering described above comprise performing isotropic filtering (e.g. bilinear filtering or trilinear filtering) at a plurality of sampling points along a major of an ellipse in texture space and combining the results of the isotropic filtering using a Gaussian kernel. In other words, a Gaussian-weighted sum of the results of the isotropic filtering is generated. As described above, one way of combining the results of the isotropic filtering using a Gaussian kernel is to identify a Gaussian weight for each isotropic filtering result based on the location of the sampling point, calculate the product of each weight and the corresponding isotropic filtering result, and calculate the sum of the products. However, calculating a Gaussian weighted sum in this manner has a number of disadvantages. First, because some of the weights, and thus the associated products, can get quite small, this method comprises summing a number of small values which can result in a large accumulated error. Secondly, this method of calculating a Gaussian weighted sum comprises calculating and storing complicated Gaussian weights at a high level of precision.

Accordingly, described herein is an improved method of calculating the Gaussian-weighted sum of isotropic filtering results which can reduce the accumulated error from small weights, and can also save time and resources. More particularly, in the methods described herein the Gaussian-weighted sum is calculated over a sequence of linear interpolations starting with the isotropic filtering results that correspond to the sampling points furthest from the centre of the major axis and moving towards the centre of the major axis.

For example, a Gaussian-weighted sum can be expressed as a sequence of linear interpolations as shown in equation (47) where $F_k$ is the result after the $k^{th}$ iteration, $\gamma_k$ is a linear interpolation factor for the $k^{th}$ iteration, and $$K = \frac{N}{2}$$

where N is the even number of sampling points along the major axis.

$$F_k = (1-\gamma_k)F_{k-1} + \gamma_k\left(\frac{L_{K-(k-1)} + R_{K-(k-1)}}{2}\right), 1 \leq k \leq K \quad (47)$$

Each iteration a current total ($F_{k-1}$) is blended with the isotropic filtering result $L_{K-(k-1)}$ corresponding to the $(K-(k-1))^{th}$ sampling point to the left of the middle point of the major axis, and the isotropic filtering result $R_{K-k}$ corresponding to the $(K-(k-1))^{th}$ sample point to the right of the middle point of the major axis using a linear interpolation factor $\gamma_k$. Accordingly, L is used to denote an isotropic filtering result that corresponds to a sampling point that is to the left of the middle point of the major axis and R is used to denote an isotropic filtering result that corresponds to a sampling point that is to the right of the middle point of the major axis. The final result $F_K$ is obtained after K iterations.

In another example, instead of combining corresponding L and R isotropic filtering results in the same iteration, the L isotropic filtering results and the R isotropic filtering results may be interpolated separately and the interpolation of the L isotropic filtering results may be averaged with the interpolation of the R isotropic filtering results. Specifically, in this example, each iteration a current total of L isotropic filtering results, $F_k^L$, is blended with the isotropic filtering result $L_{K-(k-1)}$ using a linear interpolation factor $\gamma_k$ as shown in equation (48); and a current total of R isotropic filtering results, $F_k^R$, is blended with the isotropic filtering result $R_{K-(k-1)}$ using a linear interpolation factor $\gamma_k$ as shown in equation (49). After K iterations the final result $F_K$ is calculated as the average of the final total of L isotropic filtering results $F_K^L$ and the final total of R isotropic filtering results $F_K^R$ as shown in equation (50).

$$F_k^L = (1-\gamma_k)F_{k-1}^L + \gamma_k L_{K-(k-1)}, 1 \leq k \leq K \quad (48)$$

$$F_k^R = (1-\gamma_k)F_{k-1}^R + \gamma_k R_{K-(k-1)}, 1 \leq k \leq K \quad (49)$$

$$F_K = \frac{(F_K^L + F_K^R)}{2} \quad (50)$$

Although in the second example two separate partial results are generated and stored, this approach can have the advantage of increasing cache coherency as the inner loop is performed over adjacent samples (as opposed to opposite ends of the kernel), and the outer loop can potentially be interleaved, or otherwise take account, of neighbouring fragment filter operations. For example, an anisotropic filter aligned with the horizontal screen space axis may choose to process a pair of vertically aligned fragments in parallel, first recursively interpolating the left points (which should be spatially coherent on account of the horizontal direction of anisotropy), followed by the right points, before moving on to the next vertical fragment pair to the right. Since the right points of the fragment pair to the left will move from the right to the left, and the left points of the fragment pair to the right will move from the left to the right, this can mean that the final samples from the left vertical fragment pair are close to the first samples from the right vertical fragment pair.

Figure 8:
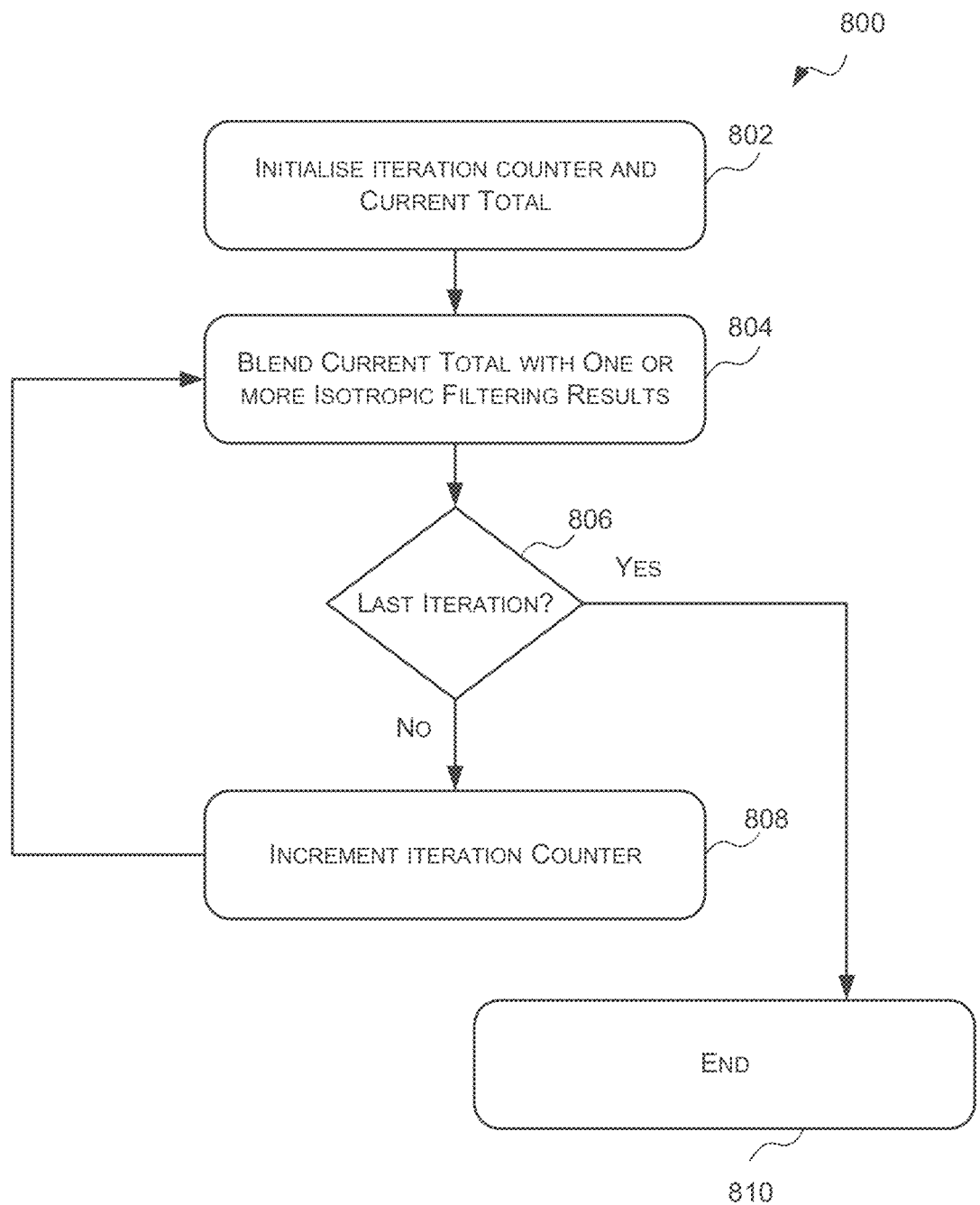
FIG. 8 is an example method of combining the isotropic filtering results of the method of FIG. 4 using a Gaussian filter.

Reference is now made to FIG. 8 which illustrates a method 800 of combining the results of isotropic filtering performed at a plurality of sampling points using a Gaussian filter via recursive linear interpolation. In other words, method 800 is an example implementation of block 408 of the method 400 of FIG. 4. The method 800 may be performed by a texture filtering unit of a graphics processing system, such as the texture filtering unit 1506 of FIG. 15.

The method 800 begins at block 802 where an iteration counter k is initialised (e.g. to 1) and the current total (i.e. $F_0$) is initialised to a starting value. If the initial interpolation factor $\gamma_1$ is 1, then $F_0$ does not contribute to the final result and the current total can be initialised to any value. This would define a normalised weighted sum purely in terms of a set of recursive weights. However, as described below, the weights for a Gaussian sum may be simplified when written directly in terms of the infinite series.

Since this series is truncated to achieve a realisable filter, the starting value $F_0$ may represent the partial result of all the truncated terms. The advantage of initialising the starting value to the partial result of all the truncated terms is that a single set of weights $\gamma$ (working from the inside out) may be defined, irrespective of the degree of truncation. In some examples, the starting value $F_0$ may be an estimate of the sum of the truncated terms in the form of a texture sample (e.g. the central value) or a known average.

In other cases, the current total (i.e. $F_0$) may be initialised to zero. In such cases, the final result may be normalised (e.g. by tabulating the missing weights for the degree of truncation for a particular ratio). Accordingly, where the current total is initialised to zero, the method 800 may further comprise, prior to block 810, a final normalisation step to rescale the result by $$\frac{1}{1-missingWeights}.$$

Once the iteration counter k and the current total have been initialised the method 800 proceeds to block 804.

At block 804, the current total is blended with the isotropic filtering result corresponding to the $(K-(k-1))^{th}$ sample point to the left of the middle point of the major axis of the ellipse (i.e. $L_{K-(k-1)}$) and/or the isotropic filtering result corresponding to the $(K-(k-1))^{th}$ sample point to the right of the middle point of the major axis of the ellipse (i.e. $R_{K-(k-1)}$) using a linear interpolation factor of $\gamma_k$ to generate a new current total. In some cases, the method 800 may be used to linearly interpolate between only the L isotropic filtering results, between only the R isotropic filtering results, or between both the L and R isotropic filtering results.

Where the method 800 is used to linearly interpolate between only the L isotropic filtering results then at block 804 $(1-\gamma_k)F_{k-1}+\gamma_k(L_{K-(k-1)})$ may be calculated where $F_{k-1}$ is the current total. In these cases, the method may further comprise repeating blocks 802 to 810 for the R isotropic filtering results and then determining the average of the interpolation of the L isotropic filtering results and interpolation of the R isotropic filtering results. Similarly, where the method 800 is used to linearly interpolate between only the R isotropic filtering results then at block 804 $(1-\gamma_k)F_{k-1}+\gamma_k(R_{K-(k-1)})$ may be calculated. In these cases, the method may further comprise repeating blocks 802 to 810 for the L isotropic filtering results and then determining the average of the interpolation of the R isotropic filtering results and interpolation of the L isotropic filtering results may be calculated to generate a final result. Where the method 800 is used to linearly interpolate between the L and R and isotropic filtering results then at block 804

$$(1-\gamma_k)F_{k-1} + \gamma_k\left(\frac{L_{K-(k-1)} + R_{K-(k-1)}}{2}\right)$$

may be calculated.

Figure 9:
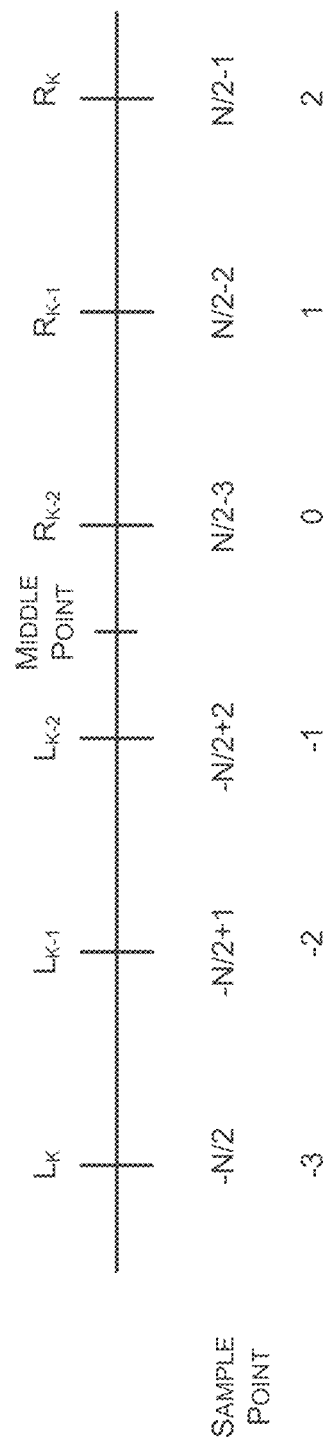
FIG. 9 is a schematic diagram illustrating an example set of isotropic filtering results for an example set of sampling points of a texture.

For example, where the method 800 is used to interpolate between the L and R isotropic filtering results corresponding to a set of evenly spaced sample points along a line shown in FIG. 9, in the first iteration (i.e. iteration 1, k=1) the average of $L_K$ and $R_K$ is blended with $F_0$ to generate $F_1$ using linear interpolation factor $\gamma_1$. In the second iteration (i.e. iteration 2, k=2) the average of $L_{K-1}$ and $R_{K-1}$ is blended with $F_1$ using linear interpolation factor $\gamma_2$ to generate $F_2$. Then, in the third iteration (i.e. iteration 3, k=3) the average of $L_{K-2}$ and $R_{K-2}$ is blended with $F_2$ using linear interpolation factor $\gamma_3$ to generate $F_3$.

In some cases, the linear interpolation factors $\gamma_k$ may be approximated with a linear function of k. One example linear function for calculating the linear interpolation factors $\gamma_k$ is shown in equation (51) where c and m may be calculated in accordance with equations (52) and (53) respectively.

$$\gamma_k = m(K-k) + c \qquad (51)$$

$$c = \frac{4e^{-\frac{1}{2\eta^2}}}{\sqrt{2\pi\eta^2}} \qquad (52)$$

$$m = \frac{(1-c)8}{3\eta^2} \qquad (53)$$

In another example, the linear interpolation factors $\gamma_k$ may be calculated in accordance with equation (54). In this case the results may be tabulated (e.g. in a hardware lookup table) directly for the finite (e.g. fixed point) set of anisotropic ratios for m and then apply lookup table optimisation techniques.

$$\gamma_k = \frac{e^{-(2(K-(k-1))-1)^2/2\eta^2}}{\sum_{m=(K-(k-1))}^{\infty} e^{-(2m-1)^2/2\eta^2}} \qquad (54)$$

Figure 10:
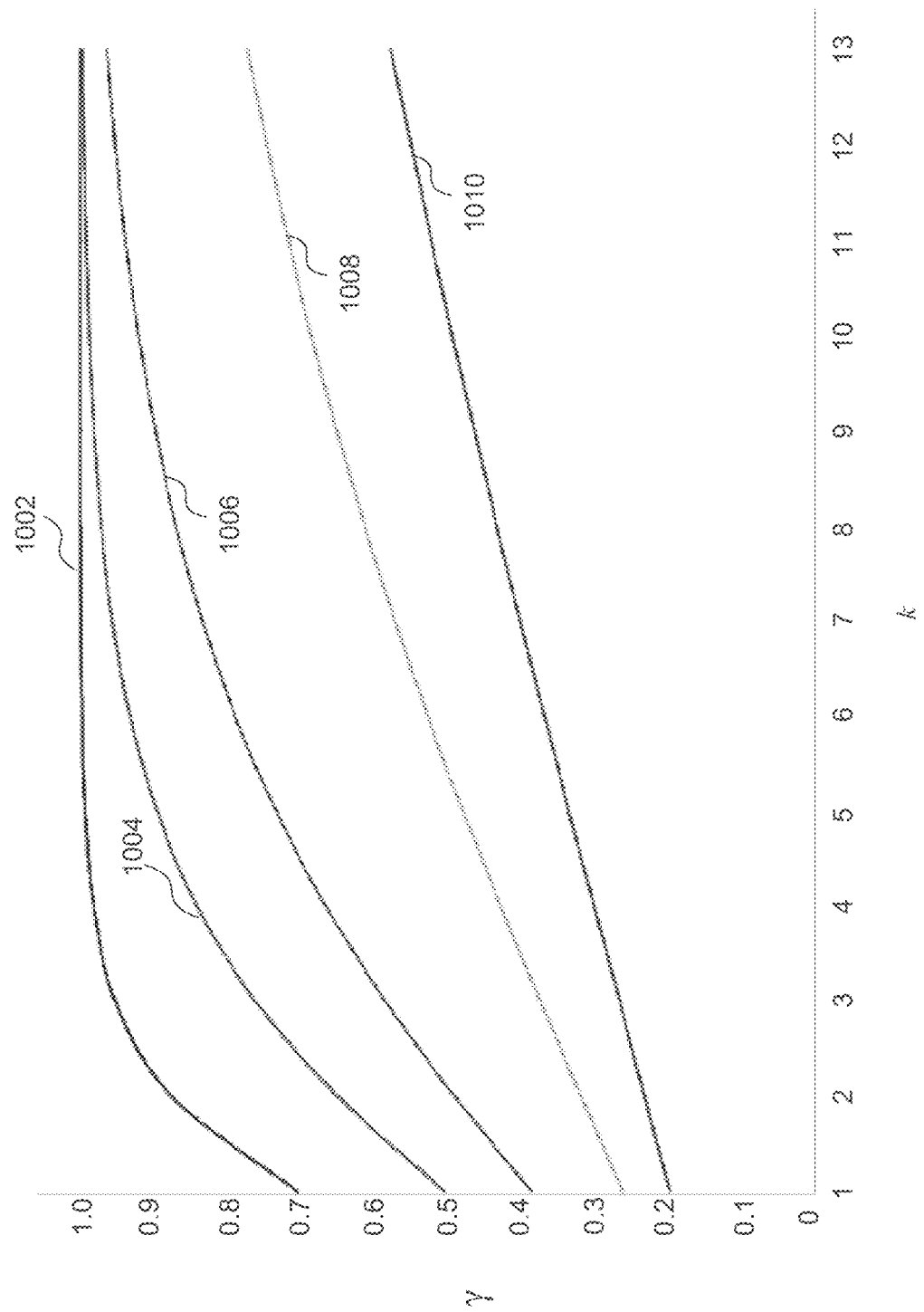
FIG. 10 is a graph illustrating linear interpolation factors for different anisotropic ratios.
Figure 11:
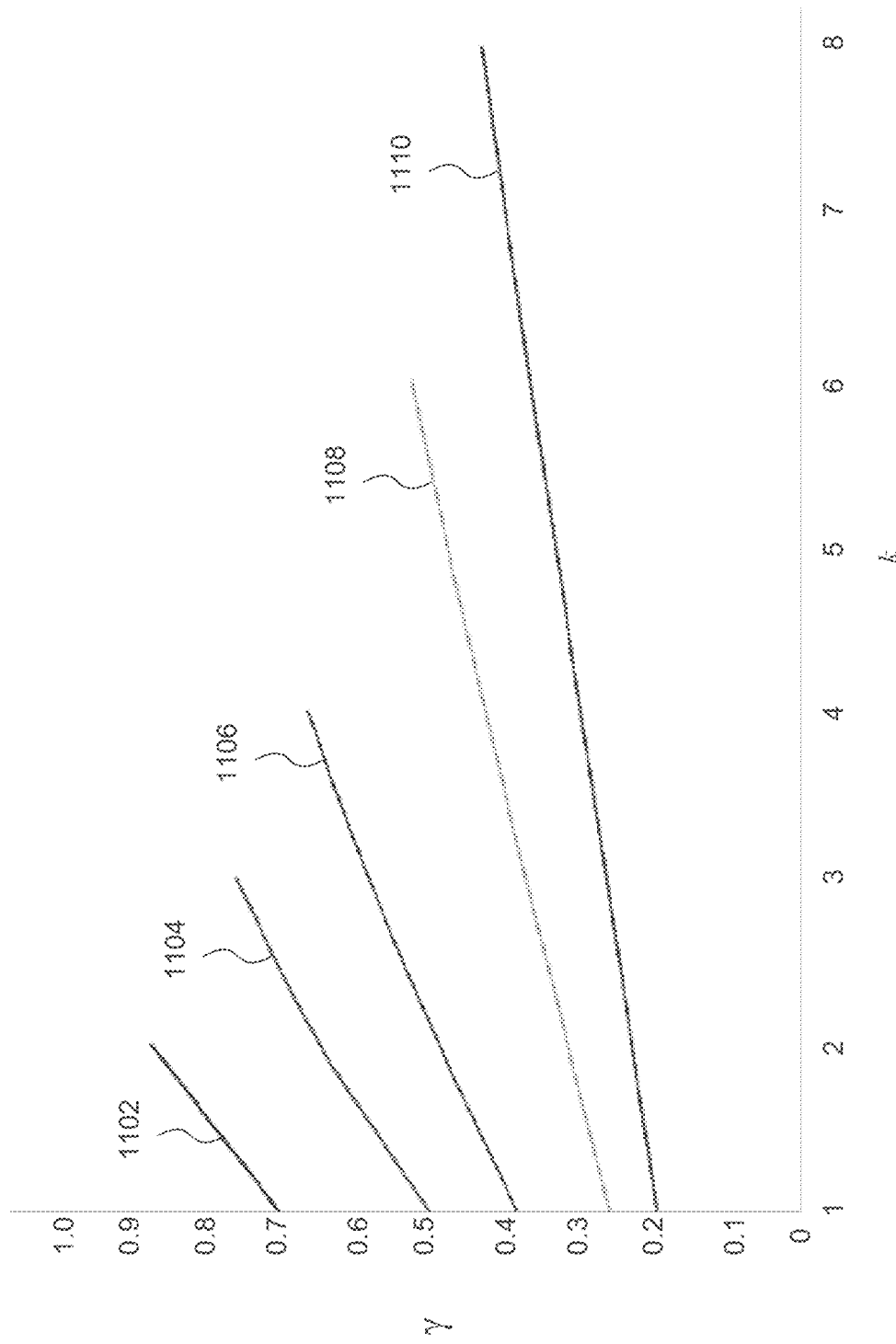
FIG. 11 is a graph illustrating linear interpolation factors for different anisotropic ratios for a truncated set of samples.

The fact that the factors $\gamma_k$ are near linear means that it is likely amenable for lookup table optimisation. For example, FIG. 10 shows graphs 1002, 1004, 1006, 1008, 1010 of the factors $\gamma_k$ of equation (54) for anisotropic ratios of 2, 3, 4, 6 and 8, respectively. It can be seen that they are generally linear. FIG. 11 shows graphs 1102, 1104, 1106, 1108 and 1110 of the factors $\gamma_k$ of equation (54) for anisotropic ratios of 2, 3, 4, 6 and 8 respectively when the number of samples cover two standard deviations. It can be seen that in these cases the factors are almost perfectly linear.

It will be evident to a person of skill in the art that these are examples only, and that other functions of k may be used to generate the linear interpolation factors. For example, in either of the examples described above η may be replaced with βη or β⌈η⌉.

Once the blending is complete the method 800 proceeds to block 806.

At block 806, it is determined whether this is the last iteration. If the iteration counter is initialised to 1, it may be determined that this is the last iteration if the iteration counter k is equal to K. As described above, K is equal to $$\frac{N}{2}$$

where N is the even number of sample points along the major axis of the ellipse. If it is determined that this is not the last iteration, then the method 800 proceeds to block 808. If, however, it is determined that this is the last iteration then the method 800 ends 810.

At block 808, the iteration counter k is incremented (i.e. k=k+1). Once the iteration counter has been incremented the method 800 proceeds back to block 804.

Calculating the Gaussian-weighted sum in accordance with the method 800 of FIG. 8 can reduce the accumulated error from the small weights because the method 800 of FIG. 8 combines isotropic filtering results for samples that are close together and thus will have similar weights. Calculating the Gaussian-weighted sum of isotropic filtering results in accordance with the method 800 of FIG. 8 can also save time and resources because, as described above, the linear interpolation factors $\gamma_k$ can be approximated with a linear function of k that can use relatively few bits of precision (e.g. 8 bits) and/or a look-up table in which to store the function parameters.

Although the method 800 of FIG. 8 is described as being used in conjunction with the method 400 of FIG. 4 wherein the spacing of the sample points along the major axis is proportional to $\sqrt{1-\eta^{-2}}$, the method 800 of FIG. 8 can be used independent of whether the spacing of the sample points along the major axis is proportional to $\sqrt{1-\eta^{-2}}$.

Although the method 800 of FIG. 8 has been described as being used to combine the results of isotropic filtering using a Gaussian filter, the method 800 may also be used to combine the results of isotropic filtering using a non-Gaussian filter or a filter that is not strictly a Gaussian filter. For example, as described in more detail below, in some cases, it may be advantageous to combine the results of isotropic filtering using weights that are not strictly Gaussian.

Selecting Anisotropic Filter Weights

In the examples described above, the weights used to combine the results of the isotropic filtering (i.e. the anisotropic filter weights) are Gaussian. In other words, the anisotropic filter is Gaussian. Using a Gaussian anisotropic filter has proven to provide good results in many cases, partially because of the frequency response of a Gaussian filter. Specifically, a Gaussian filter, which has a Gaussian response in the frequency or spectral domain, acts as a low pass frequency filter which has a minimum spectral width or variance (in the modulus squared sense as described below) for a given spatial width or variance.

This can be illustrated mathematically. Specifically, let F: $\mathbb{R} \to \mathbb{R}$ be a continuous filter defined by equation (55) where $\phi: \mathbb{R} \to \mathbb{R}$ is a real function (which may be referred to as the first function) defined such that the weights of the filter are non-negative. The filter F identifies, or specifies, the weights associated with different positions along an X axis (i.e. for different x values). In the anisotropic texture filtering context x represents the position of a sampling point with respect to the midpoint of the major axis. The integral of the filter from negative infinity to positive infinity, denoted |F|, can be expressed by equation (56); the mean of the filter, denoted $\bar{x}(F)$, can be expressed by equation (57); and the variance of the filter, denoted $\bar{x}^2(F)$, can be expressed by equation (58).

$$F(x) = |\phi(x)|^2 \tag{55}$$

$$|F| = \int_{-\infty}^{+\infty} dx |\phi(x)|^2 \tag{56}$$

$$\bar{x}(F) = \frac{1}{|F|} \int_{-\infty}^{+\infty} dx\, x |\phi(x)|^2 \tag{57}$$

$$\bar{x}^2(F) = \frac{1}{|F|} \int_{-\infty}^{+\infty} dx (x - \bar{x}(F))^2 F(x) = \frac{1}{|F|} \int_{-\infty}^{+\infty} dx\, x\phi(x)|^2 \tag{58}$$

The frequency response of $\phi$ is denoted $\tilde{\phi}$ with $\tilde{\phi}: \mathbb{R} \to \mathbb{C}$. The relationship between $\phi$ and its frequency response $\tilde{\phi}$ is described by equations (59) and (60).

$$\tilde{\phi}(f) = \int_{-\infty}^{+\infty} dx \phi(x) e^{-i2\pi f x} \tag{59}$$

$$\phi(x) = \int_{-\infty}^{+\infty} df \tilde{\phi}(f) e^{+i2\pi f x} \tag{60}$$

The modulus squared spectral variance of $\tilde{\phi}$ can then be written as shown in equation (61) where $\tilde{F}(f)=|\tilde{\phi}(f)|^2$ and $\phi'(x)$ is the first derivative of $\phi$ with respect to x $$\left(\text{i.e. } \phi'(x) = \frac{d\phi}{dx}\right).$$

$$\frac{\bar{x}^2(\tilde{F})}{4\pi^2} = \frac{1}{4\pi^2} \frac{\int_{-\infty}^{+\infty} df |(f - \bar{x}(\tilde{F}))\tilde{\phi}(f)|^2}{\int_{-\infty}^{+\infty} df |\tilde{\phi}(f)|^2} = \frac{\int_{-\infty}^{+\infty} dx |\phi'(x)|^2}{\int_{-\infty}^{+\infty} dx |\phi(x)|^2} \tag{61}$$

The expression of the modulus squared spectral variance of $\phi$ shown in equation (61) can be used to express the product of the modulus squared spatial and spectral variances purely in terms of integral expressions involving $\phi(x)$ and its derivative, as shown in equation (62).

$$\frac{\sqrt{\overline{x^2}(F)\cdot\overline{x^2}(\overline{F})}}{2\pi} = \sqrt{\left[\frac{\int_{-\infty}^{+\infty}dx|x\phi(x)|^2}{\int_{-\infty}^{+\infty}dx|x\phi(x)|^2}\right]\cdot\left[\frac{\int_{-\infty}^{+\infty}dx|\phi'(x)|^2}{\int_{-\infty}^{+\infty}dx|\phi(x)|^2}\right]} \quad (62)$$

The derivative of the product (equation (62)) can then be expressed by equation (63) where $\phi''(x)$ is the second derivative of $\phi$ with respect to x $$\left(\text{i.e. } \phi''(x) = \frac{d^2\phi}{dx^2}\right).$$

$$\frac{x^2\phi(x)}{\int_{-\infty}^{+\infty}dx|x\phi(x)|^2} - \frac{\phi''(x)}{\int_{-\infty}^{+\infty}dx|\phi'(x)|^2} - \frac{2\phi(x)}{\int_{-\infty}^{+\infty}dx|\phi(x)|^2} \quad (63)$$

It can be verified that when the filter F is a Gaussian filter as shown in equation (64), the product of equation (62) is minimized (i.e. equation (63)=0). Specifically, this can be seen by direct substitution of equation (64) into equation (63) where $$\int_{-\infty}^{+\infty}dx|\phi'(x)|^2 = \frac{1}{4\eta^2} \text{ and } \phi''(x) = \left(\frac{x^2}{4\eta^4} - \frac{1}{2\eta^2}\right)\phi(x)$$

for the Gaussian filter F of equation (64).

$$F(x) = |\phi(x)|^2 = \frac{1}{\sqrt{2\pi\eta^2}}e^{-\frac{x^2}{2\eta^2}} \quad (64)$$

However, when a continuous Gaussian is approximated by a truncated Gaussian (such that only a portion of the Gaussian curve is represented), and particularly when a discrete Gaussian is truncated to a finite number of sample points, the frequency response becomes less ideal (i.e. it looks less Gaussian). Specifically, more unwanted, or higher, frequencies are allowed to pass (i.e. they are not sufficiently attenuated). This becomes more pronounced as the sample points decreases. Accordingly, using an anisotropic filter with Gaussian weights may not provide the best filtering results in all cases. The inventors have identified that instead of automatically using Gaussian weights, the best weights for the anisotropic filter may be determined by selecting the weights that minimize a cost function which penalizes high frequencies in the frequency response under certain constraints. For example, the weights of the filter F may be selected so as to minimize the product of the modulus squared spatial and spectral variances of $\phi$ (i.e. equation (65)) so as to achieve the most Gaussian-like frequency response—i.e. a frequency response with a minimum spectral variance for $\phi$ for a given spatial variance. It is noted that it is the product of the modulus squared spatial and spectral variances of $\phi$ that is minimized rather than simply the spectral variance of $\phi$ as minimizing the spectral variance alone would not provide meaningful results as it would push the weights to values that result in no spectral variance—i.e. zero (non-zero) frequencies.

$$\frac{\sqrt{\overline{x^2}(F)\cdot\overline{x^2}(\overline{F})}}{2\pi} \quad (65)$$

Figure 12:
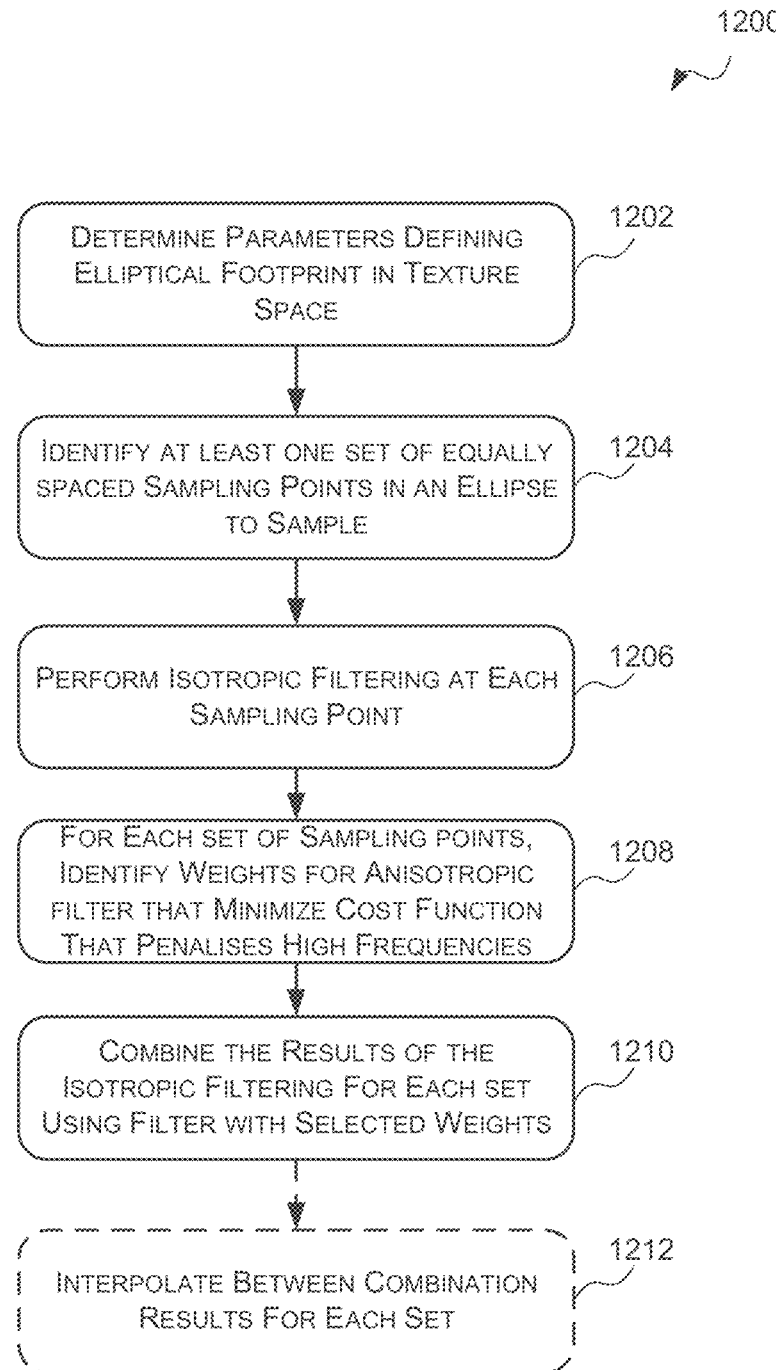
FIG. 12 is a flow diagram of a second example method of performing anisotropic texture filtering in accordance with an embodiment.

Reference is now made to FIG. 12 which illustrates an example method 1200 of performing anisotropic texture filtering in which the weights of the anisotropic filter are selected to minimize the spectral width or variance thereof. The method 1200 begins at block 1202 where the parameters defining an elliptical footprint in texture space are determined. Block 1202 generally corresponds to block 402 of the method 400 of FIG. 4 thus the parameters that may be generated and the methods of generating the parameters described with respect to block 402 equally apply to block 1202. Once the parameters defining an elliptical footprint in texture space have been determined the method 1200 proceeds to block 1204.

At block 1204, one or more sets of equally spaced sampling points (which may also be referred to as sample points) in the texture space, based on the elliptical footprint defined in block 1202, are identified. In some cases, the equally spaced sample points may lie along the major axis of the ellipse. All of the methods and techniques described above for (i) determining the number of sample points per set, (ii) identifying the number of sets, and (iii) identifying the position and/or spacing of the sample points described above (e.g. the methods and techniques described in relation to block 404 of the method 400 of FIG. 4) equally apply to block 1204. Once one or more sets of equally spaced samples points in texture space have been identified, the method 1200 proceeds to block 1206.

At block 1206, isotropic filtering is performed at each sampling point identified in block 1204. Block 1206 generally corresponds to block 406 of the method 400 of FIG. 4 so any of the methods and techniques for performing isotropic filtering on the sample points described in relation to block 406 equally apply to block 1206. Once the isotropic filtering at the sample points has been performed, the method 1200 proceeds to block 1208.

At block 1208, an anisotropic filter is selected for each set of equally spaced sample points identified in block 1204, based on one or more parameters of the set of samples and at least one or more parameters of the elliptical footprint. The one or more parameters of the set of samples may comprise the number of samples N in the set, the offset $\psi$ indicating a location of a first sample in the set, and/or the spacing $\sigma$ between adjacent samples in the set. The one more parameters of the elliptical footprint may comprise the anisotropic ratio or parameters from which the anisotropic ratio can be determined.

The weights of each anisotropic filter are selected, based on the parameters, to be the weights that minimize a cost function that penalizes high frequencies in the frequency response of the anisotropic filter, under one or more constraints to ensure that the filter satisfies one or more features of a texture filter.

For example, in some cases it may be desirable for a texture filter to be normalised to remove a global brightness factor (i.e. a DC component). Accordingly, the anisotropic filter may be constrained to be normalised. Such a constraint may be referred to as the normalization constraint, and for the example filter F defined in equation (55) may be expressed by equation (66).

$$|F| = \int_{-\infty}^{+\infty} dx |\phi(x)|^2 = 1 \tag{66}$$

In some cases, it may be desirable that the weights of a texture filter be centred around the origin of the co-ordinate system. Accordingly, the mean of the anisotropic filter may be constrained to be zero. Such a constraint may be referred to as the mean constraint, and for the example filter F defined in equation (55) may be expressed by equation (67).

$$\bar{x}(F) = \frac{1}{|F|} \int_{-\infty}^{+\infty} dx\, x|\phi(x)|^2 = 0 \tag{67}$$

As described above, it has been determined that it is desirable that the anisotropic filter have a variance of $\eta^2$ where $\eta$ is the anisotropic ratio when expressed in units of standard deviations of the corresponding isotropic filter. Accordingly, the anisotropic filter may be constrained to have a variance of $\eta^2$. Such a constraint may be referred to as the variance constraint, and for the example filter F defined in equation (55) may be expressed by equation (68).

$$\bar{x}^2(F) = \frac{1}{|F|} \int_{-\infty}^{+\infty} dx (x - \bar{x}(F))^2 F = \frac{1}{|F|} \int_{-\infty}^{+\infty} dx\, x|\phi(x)|^2 = \eta^2 \tag{68}$$

The cost function that is minimized may be any cost function that penalizes high frequencies in the frequency response or spectrum response of the anisotropic filter. As described above, when a continuous Gaussian filter is approximated by a truncated Gaussian, the frequency response deviates from the ideal continuous Gaussian filter frequency response and may allow unwanted frequencies. Accordingly, the quality of the filtering result produced by the anisotropic filter may be improved by selecting filter weights that result in a desirable frequency response (e.g. more Gaussian-like frequency response).

As described above, a more Gaussian-like frequency response may be achieved by selecting weights that minimize the product of the modulus squared spatial and spectral variances of $\phi$ where $F(x)=|\phi(x)|^2$. So, if the spatial variance of $\phi$ is fixed or known, then minimizing equation (65) minimizes the spectral variance of $\phi$. Equation (65) may be referred to as the Gaussian cost function.

In other cases, instead of selecting weights that minimize a cost function (e.g. equation (65)) that pushes the anisotropic filter to have a frequency response as close as possible to a Gaussian frequency response, another cost function may be used which pushes the anisotropic filter to have a frequency response that is not Gaussian but is similar. For example, instead of selecting weights that minimize equation (65), the weights may be selected to minimize the $L_2$ norm of the anisotropic filter F. As is known to those of skill in the art, the $L_2$ norm, also referred to as the Euclidean norm, is the length of a vector. For the anisotropic filter F of equation (55) the $L_2$ norm can be expressed by equation (69). This may be referred to as the norm cost function.

$$\|F\|_2 = \left( \int_{-\infty}^{+\infty} dx |F(x)|^2 \right)^{\frac{1}{2}} = \left( \int_{-\infty}^{+\infty} dx |\phi(x)|^4 \right)^{\frac{1}{2}} \tag{69}$$

However, equation (69) itself cannot be minimized, as selecting weights that minimize equation (69) would select weights that will tend towards no (non-zero) frequencies in the frequency domain. Specifically, equation (69) does not show a preference for desirable passband frequencies over undesirable stop band frequencies. Accordingly, Lagrange multipliers $\lambda$ and $\mu$ may be used to enforce the constraints described above. Specifically, $\lambda$ can be used to enforce the variance constraint, and $\mu$ can be used to enforce the normalization constraint. Equation (69) can then be written with the Lagrange multipliers as shown in equation (70). It is noted that the inventors have determined that the solution will satisfy the mean condition. Therefore the mean condition is assumed to be true and is not explicitly enforced using a Lagrange multiplier.

$$\int_{-\infty}^{+\infty} dx |\phi(x)|^4 + \lambda \left( \int_{-\infty}^{+\infty} dx\, x |\phi(x)|^2 - \eta^2 \right) + \mu \left( \int_{-\infty}^{+\infty} dx |\phi(x)|^2 - 1 \right) \tag{70}$$

The variational derivative of equation (70) is shown (with common factors removed) in equation (71). The filter F that minimizes equation (70) can thus be identified by setting equation (71) to zero. It can be shown that equation (71) is equal to zero, and thus equation (70) is minimized, when the filter F is as shown in equation (72). In other words, equation (69) is minimized under the constraints when the filter F is as shown in equation (72).

$$\phi(x)(2\phi^2(x) + \lambda x^2 + \mu) \tag{71}$$

$$F(x) = |\phi(x)|^2 = \begin{cases} \dfrac{3}{4\sqrt{5\eta^2}} \left(1 - \dfrac{x^2}{5\eta^2}\right) & |x| \leq \sqrt{5\eta^2} \\ 0 & |x| > \sqrt{5\eta^2} \end{cases} \tag{72}$$

Figure 13:
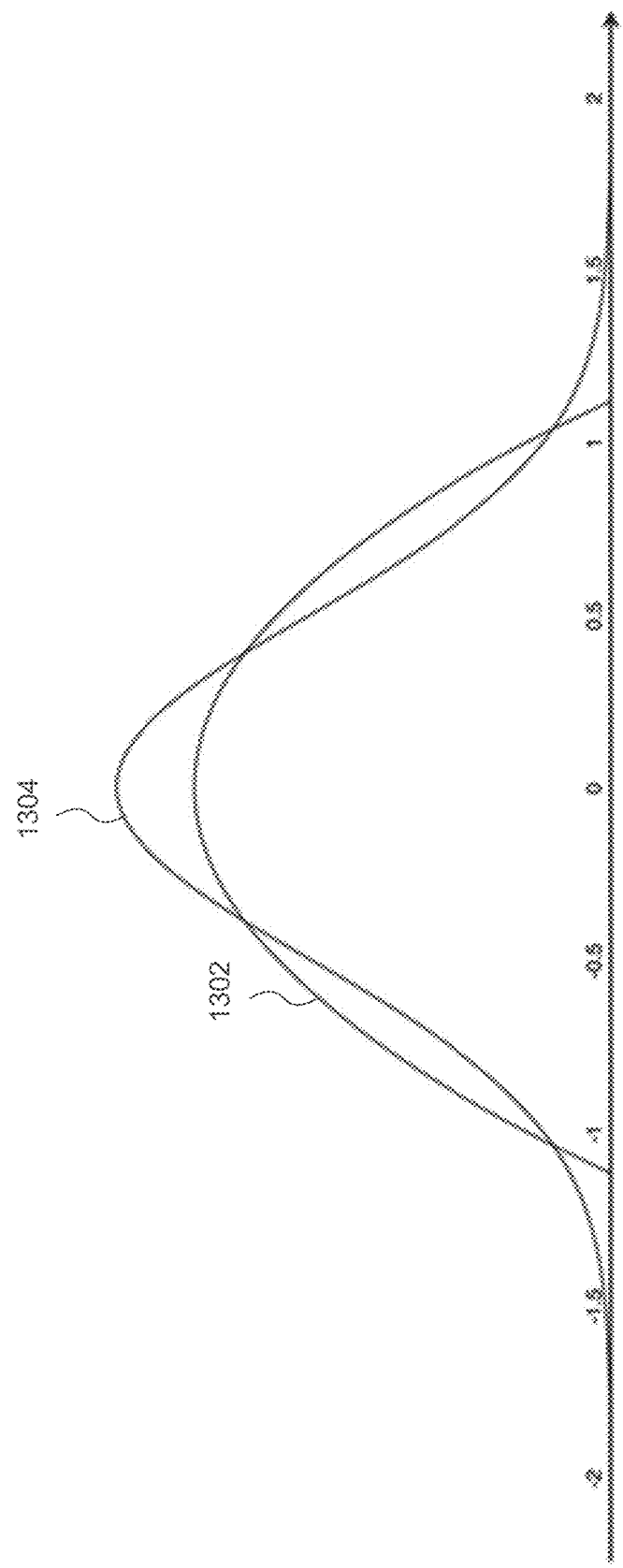
FIG. 13 is a graph showing the impulse response for two example filters.

The impulse response of the filter as set out in equation (72) is shown at 1302 in FIG. 13 compared to the impulse response of a Gaussian filter shown at 1304 for $\eta=2$. It can be seen that such a filter has finite support (i.e. width) with radius $\sqrt{5\eta^2} \approx 2.24\eta$.

Figure 14:
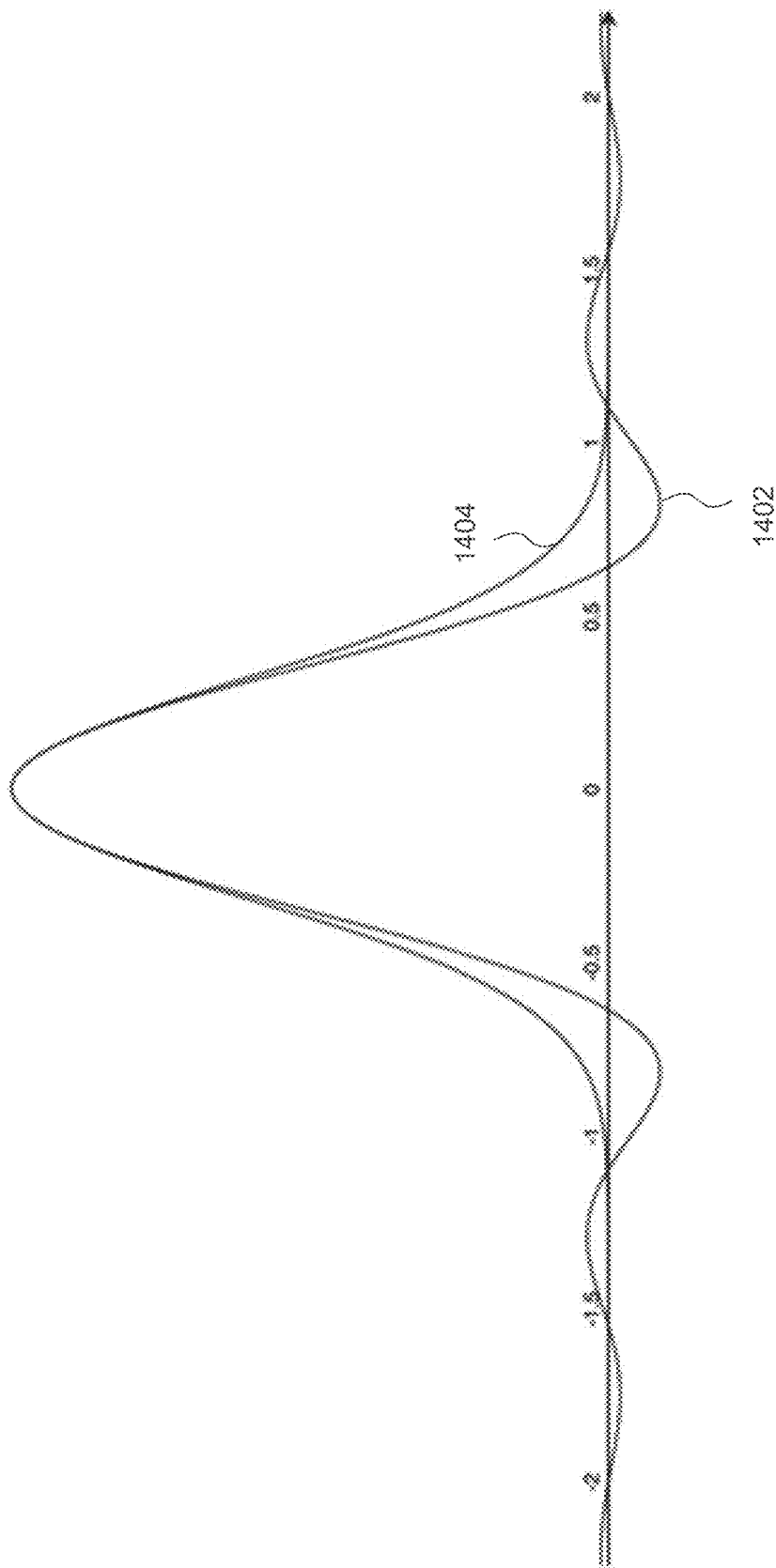
FIG. 14 is a graph showing the frequency response for the two example filters of FIG. 13.

The frequency response of the filter F of equation (72), denoted $\tilde{F}(f)$, can be expressed by equation (73) and is shown at 1402 in FIG. 14 compared to the frequency response of a Gaussian filter shown at 1404 for $\eta=2$. It can be seen that the frequency response is only mildly inferior compared to the Gaussian which indicates that this is a suitable method of identifying a good set of weights for the anisotropic filter.

$$\tilde{F}(f) = \int_{-\sqrt{5\eta^2}}^{+\sqrt{5\eta^2}} dx \frac{3}{4\sqrt{5\eta^2}} \left(1 - \frac{x^2}{5\eta^2}\right) e^{-i2\pi f x} = \tag{73}$$

$$3 \left[ \frac{\sin(2\pi\sqrt{5\eta^2}\, f)}{(2\pi\sqrt{5\eta^2}\, f)^3} - \frac{\cos(2\pi\sqrt{5\eta^2}\, f)}{(2\pi\sqrt{5\eta^2}\, f)^2} \right]$$

Accordingly, selecting weights for the anisotropic filter that minimize equation (69), under the constraints, and specifically under the variance constraint, will select weights that have a spatial response as close to 1302 of FIG. 13 as possible and a frequency response as close to 1402 as possible.

In other cases, instead of selecting weights that minimize equation (65) or equation (69), the weights that minimize the spectral spread of $F^2$ as set forth in equation (74) may be selected. This may be referred to as the spectral cost function.

$$\int_{-\infty}^{+\infty} dx |\phi'(x)\phi(x)|^2 \qquad (74)$$

Like the L2 norm equation (i.e. equation (69)), equation (74) itself cannot be minimized, as selecting weights that minimize equation (74) would select weights that tend to produce no (non-zero) frequencies in the frequency domain. Specifically, equation (74) does not show a preference for desirable passband frequencies over undesirable stop band frequencies. Accordingly, Lagrange multipliers $\lambda$ and $\mu$ may be used to enforce the constraints described above. Specifically, $\lambda$ can be used to enforce the variance constraint, and $\mu$ can be used to enforce the normalization constraint. Equation (74) can then be written with the Lagrange multipliers as shown in equation (75).

$$\int_{-\infty}^{+\infty} dx |\phi'(x)\phi(x)|^2 + \lambda \left( \int_{-\infty}^{+\infty} dx |x\phi(x)|^2 - \eta^2 \right) + \mu \left( \int_{-\infty}^{+\infty} dx |\phi(x)|^2 - 1 \right) \qquad (75)$$

The variational derivative of equation (75) is shown in equation (76). The filter F that minimizes equation (75) can thus be identified by setting equation (76) to zero.

$$\phi(x)(-\phi'^2(x)-\phi''(x)\phi(x)+\lambda x^2+\mu) \qquad (76)$$

It will be evident to a person of a skill in the art that the filter set out in equation (68) will also set equation (76) to zero, and thus will minimize equation (75). So, selecting the weights using equations (69) or (74), under the constraints, appear to produce similar results—i.e. they will both select weights that have a spatial response as close to 1302 of FIG. 13 as possible and a frequency response as close to 1402 of FIG. 14 as possible.

In some cases, the weights the minimize of one of the cost functions, under the constraints, may be dynamically determined—i.e. on the fly. However, this can be a fairly time and resource intensive process. Accordingly, in other cases, the weights that minimize one or more of the cost functions, under the constraints, may be determined off-line for expected ranges of the parameters—e.g. for ranges of sets of sample points S (which is described above and below), anisotropic ratios $\eta$, and sample spacing $\sigma$). In such cases, the results may be stored in a look up table which is indexed by the parameters (e.g. set of sample points S, anisotropic ratio $\eta$, and sample spacing $\sigma$).

Once the weights for an anisotropic filter for each set of sampling points have been selected, the method 1200 proceeds to block 1210.

At block 1210, the isotropic filter results for each set of sampling points are combined using the corresponding filter weights identified in block 1208. Block 1210 generally corresponds to block 408 of the method 400 of FIG. 4, except that instead of using Gaussian weights to combine the results of the isotropic filtering, the weights selected in block 1208 are used to combine the results. Any of the methods and techniques described above for combining isotropic filter results using an anisotropic filter can be used in block 1210. For example, any of the methods and techniques described in relation to block 408 or any of the methods and techniques described in relation to method 800 of FIG. 8 for combining isotropic filter results may be used in block 1210. Where only one set of sampling points was identified then the method 1200 may end. However, where more than one set of sampling points was identified in block 1204 then the method 1200 may proceed to block 1212.

At block 1212, it is interpolated between the combination results generated in block 1210 for each set of sampling points. Block 1212 generally corresponds to block 410 of the method 400 of FIG. 4 and thus any of the methods and techniques for interpolating between combination results for different sets of sampling points equally apply to block 1212. Once the interpolation has been performed the method 1200 may end. The result of the method (block 1210 or block 1212) which may be referred to as a filter result or a filtered texture value may be output for further processing. For example, the output of the method (block 1210 or block 1212) may be output to a shader (or another component) of a graphics processing system or graphics processing unit for use in generating a rendering output (e.g. an image).

Examples of how the weights for a discrete anisotropic filter for a set of sampling points may be selected in accordance with block 1208 of the method 1200 of FIG. 12 for a different number of samples will now be described. Let the discrete anisotropic filter $A(x)$ with weights $A_n$ be defined by equation (77) where, as described above, $\delta$ is the Dirac function, $\psi$ is the offset from the centre of the major axis at which the first sample point in the set S is placed and $\sigma$ is the distance between sampling points. It is noted that, in contrast with the earlier description, $A(x)$ is given in units of standard deviations of the isotropic filter such that, for example $$\sigma = \frac{2}{\beta}\sqrt{1-\eta^{-2}} \text{ or } \sigma = \frac{2}{\beta}\frac{\eta}{\lceil\eta\rceil}\sqrt{1-\eta^{-2}}$$

in these units (when applying equations (45) and (37) respectively), which should be borne in mind when comparing expressions. The set of sample points S comprises N sampling points and can be expressed as shown in equation (78).

$$A(x) = \sum_{n \in S} A_n \delta(x - (n + \psi)\sigma) \qquad (77)$$

$$S = \mathbb{Z} \cap \left[ -\frac{N}{2} - \psi, +\frac{N}{2} - \psi \right) \qquad (78)$$

The normalization, mean, and variance constraints for the discrete anisotropic filter, which now take into account the variance of the isotropic filter such that $\eta^2-1$ is used (the variance of the isotropic filter is 1 by definition of the units) in place of $\eta^2$, can be expressed by equations (79), (80) and (81) respectively.

$$\sum_{n \in S} A_n = \int_{-\infty}^{+\infty} dx \sum_{n \in S} \delta(x - (n+\psi)\sigma) A_n = |A| = 1 \quad (79)$$

$$\sum_{n \in S}(n+\psi) A_n = \frac{1}{\sigma|A|}\int_{-\infty}^{+\infty} dx \sum_{n \in S} \delta(x-(n+\psi)\sigma) x A_n = \frac{1}{\sigma}\bar{x}(A) = 0 \quad (80)$$

$$\sum_{n \in S}(n+\psi)^2 A_n = \quad (81)$$

$$\frac{1}{\sigma^2|A|}\int dx \sum_{n \in S} \delta(x-(n+\psi)\sigma)(x-\bar{x}(A))^2 A_n = \frac{1}{\sigma^2}\bar{x}^2(A) = \frac{\eta^2-1}{\sigma^2}$$

If $\psi=0$ and N is odd, or if $$\psi = \frac{1}{2}$$

and N is even, then the mean constraint can be satisfied by setting $A_{-n}=A_n$ when N is odd and $A_{-n-1}=A_n$ when N is even. This also ensures that the spectrum of the anisotropic filter is real so the effects of phase do not have to be taken into account.

The mean and variance constraints can then be further simplified to equations (82) and (83) respectively.

$$\sum_{n \in S} n A_n = -\psi + \sum_{n \in S}(n+\psi) A_n = -\psi \quad (82)$$

$$\sum_{n \in S} n^2 A_n = \psi^2 + \sum_{n \in S}(n+\psi)^2 A_n = \frac{\eta^2-1}{\sigma^2} + \psi^2 \quad (83)$$

As is known to those of skill in the art, each constraint reduces the degrees of freedom of the solutions. As there are three equations and only one unknown (i.e. weight $A_0$) the problem is over-constrained if there only one sample point (i.e. N=1) unless $\eta^2=1$, and as described in more detail below, the weights are fully constrained for 2, 3 or 4 samples.

For example, if there are two sampling points (i.e. N=2) and $0 \leq \psi < 1$ then there are two weights ($A_{-1}+A_0$) and the normalisation constraint gives $A_{-1}+A_0=1$ and the mean constraint gives $A_{-1}=\psi A_0=1-\psi$. If $\psi=0$ then there is only one non-zero weight and thus the problem becomes over-constrained. Even if $\psi$ is greater than 0 then it can be seen from the variance constraint that the problem is still over-constrained (more equations than unknowns) unless the spacing between sampling points is as set out in equation (84). Therefore when there are only two sampling points, the spacing between sampling points is the only thing that can be controlled to satisfy the constraints. Accordingly the ideal Gaussian spacing described above with respect to FIG. 4 would not be used in the method 1200 of FIG. 12 for only two samples.

$$\sigma = \sqrt{\frac{\eta^2-1}{\psi(1-\psi)}} \quad (84)$$

As described above, the width of the filter is preferably an integer multiple of two standard deviations. When $$\psi = \frac{1}{2}$$

the spacing set out in equation (80) may reach two standard deviations when $\eta=\sqrt{2}$ so two samples may be sufficient when the anisotropic ratio is less than $\sqrt{2}$.

If there are three sampling points (i.e. $N=3$) and $-\frac{1}{2} \leq \psi < \frac{1}{2}$ there will be three weights $A_{-1}$, $A_0$ and $A_1$. The normalisation constraint gives $A_{-1}+A_0+A_1=1$ and the mean constraint gives $A_1-A_{-1}=-\psi$ which gives the weights as shown at (85).

$$A_{-1}=A_1+\psi; A_0=1-2A_1-\psi \quad (85)$$

The variance constraint then gives $$A_1 = \frac{1}{2}\left(\frac{\eta^2-1}{\sigma^2} - \psi(1-\psi)\right).$$

Unlike the two sample case, the weights will satisfy the constraints for all values of $\eta$ and $\sigma$. However, the variance may only be a meaningful indication of degree of low-pass filtering when $A_n \geq 0$. The requirement that $A_0$ is positive gives equation (86), and the requirement that $A_1$ and $A_{-1}$ are positive gives the equations at (87).

$$A_0 \geq 0 \Rightarrow 2A_1 \leq 1 - \psi \Rightarrow \frac{\eta^2-1}{\sigma^2} \leq 1 - \psi^2 \quad (86)$$

$$A_1 \geq 0 \Rightarrow \frac{\eta^2-1}{\sigma^2} \geq \psi(1-\psi); A_{-1} \geq 0 \Rightarrow \frac{\eta^2-1}{\sigma^2} \geq -\psi(1+\psi) \quad (87)$$

This then gives equation (88) which sets out, for a given spacing $\sigma$ and offset $\psi$, the values of $\eta$ for which 3 sampling points is sufficient to satisfy the constraints.

$$|\psi|(1-|\psi|) \leq \frac{\eta^2-1}{\sigma^2} \leq 1 - \psi^2 \quad (88)$$

For example, if $\sigma = 2\sqrt{1-\eta^{-2}}$ expressed in units of one standard deviation (which corresponds to $\sigma = \sqrt{1-\eta^{-2}}$ expressed in units of two standard deviations) and $\psi=0$ are substituted into equation (88) $1 \leq \eta \leq 2$.

If there are four sampling points (i.e. N=4) the problem is under-constrained as there are four unknowns (i.e. four filter weights) and only three constraints. However, if $$\psi = \frac{1}{2} \text{ and } A_{-n-1} = A_n$$

the mean restraint is guaranteed and the weights are then fully constrained. The normalisation constraint then gives $1=A_{-2}+A_{-1}+A_0+A_1=2(A_0+A_1)$ which gives the weights shown at (89).

$$A_{-2} = A_1; A_{-1} = A_0; A_0 = \frac{1}{2} - A_1 \quad (89)$$

The variance constraint gives equation (90) and the constraint that the weights are positive gives the equations at (91).

$$\frac{\eta^2 - 1}{\sigma^2} + \frac{1}{4} = 4A_{-2} + A_{-1} + A_1 = 5A_1 + \frac{1}{2} - A_1 \Rightarrow A_1 = \frac{1}{4}\left(\frac{\eta^2 - 1}{\sigma^2} - \frac{1}{4}\right) \quad (90)$$

$$A_0 \geq 0 \Rightarrow \frac{\eta^2 - 1}{\sigma^2} \leq 2 + \frac{1}{4}; A_1 \geq 0 \Rightarrow \frac{\eta^2 - 1}{\sigma^2} \geq \frac{1}{4} \quad (91)$$

If the spacing described above with respect to FIG. 4, which may be referred to as the Gaussian spacing, is used (i.e. $\sigma = 2\sqrt{1-\eta^{-2}}$) then $1 \leq \eta \leq \sqrt{5}$. This produces the weights in equation (92) for $\eta = 2$.

$$A_{-2} = \frac{3}{16}; A_{-1} = \frac{5}{16}; A_0 = \frac{5}{16}; A_1 = \frac{3}{16} \quad (92)$$

However, a different spacing of the sampling points may be used to mimic different filters. For example, if a spacing proportional to the inverse of standard deviation of a tent filter is used $$\left(\text{i.e. } \sigma = \sqrt{6}\right) \text{ then } \sqrt{\frac{5}{2}} \leq \eta \leq \sqrt{\frac{29}{2}}.$$

This produces the weights shown at (93) for $\eta = 2$ which are the weights for a sampled tent filter.

$$A_{-2} = \frac{1}{8}; A_{-1} = \frac{3}{8}; A_0 = \frac{3}{8}; A_1 = \frac{1}{8} \quad (93)$$

If a spacing proportional to the inverse of the standard deviation for a box filter is used (i.e. $\sigma = \sqrt{12}$) then $2 \leq \eta \leq 5$. This produces the weights shown at (94) for $\eta = 2$ and the weights as shown at (95) for $\eta = 4$, which are the weights for a sampled box filter.

$$A_{-2} = 0; A_{-1} = \frac{1}{2}; A_0 = \frac{1}{2}; A_1 = 0 \quad (94)$$

$$A_{-2} = \frac{1}{4}; A_{-1} = \frac{1}{4}; A_0 = \frac{1}{4}; A_1 = \frac{1}{4} \quad (95)$$

Accordingly, it can be seen that the texture filtering constraints themselves may be sufficient to determine the weights for a small number of sampling points. For more sampling points (i.e. N>4) the weights can be selected as those that minimize one of the cost functions described above (or, as described in more detail below, analogous discrete cost functions).

For example, for more sampling points (i.e. N>4) the anisotropic filter A can be pre-convolved with a Gaussian to define $|\phi(x)|$ according to equation (96) where the goal of the minimization is to identify $\phi_n$ and thus $A_n$. The pre-convolution with a Gaussian is performed because it is ultimately the frequency response of the composite filter that is of interest.

$$|\phi(x)|^2 = F(x) = (\Gamma * A)(x) = \frac{1}{\sqrt{2\pi}} \sum_{n \in S} e^{-\frac{1}{2}(x-(n+\psi)\sigma)^2} |\phi_n|^2 \quad (96)$$

For the discrete filter the normalization, mean and variance conditions as set out in equations (77), (80) and (81) can be written for the discrete function as shown in equations (97), (98) and (99)

$$\sum_{n \in S} |\phi_n|^2 = 1 \quad (97)$$

$$\sum_{n \in S} n|\phi_n|^2 = -\psi \quad (98)$$

$$\sum_{n \in S} n^2|\phi_n|^2 = \frac{\eta^2 - 1}{\sigma^2} + \psi^2 \quad (99)$$

Then $A_n$ are selected that minimize one of the cost functions set out above (e.g. one the cost functions set out in equations (65), (70) and (75).

It can be seen that the constraints set out in equations (97), (98) and (99) can be used to simplify the cost functions set out in equation (65), (70) and (75) to equations (100), (101) and (102) respectively, as the constraints can be imposed directly (and hence substituted into the earlier equations).

$$\frac{\sqrt{\bar{x}^2(F) \cdot \bar{x}^2(\bar{F})}}{2\pi} = \quad (100)$$

$$\sqrt{\left(\frac{\int_{-\infty}^{+\infty} dx |x\phi(x)|^2}{\int_{-\infty}^{+\infty} dx |\phi(x)|^2}\right) \cdot \left(\frac{\int_{-\infty}^{+\infty} dx |\phi'(x)|^2}{\int_{-\infty}^{+\infty} dx |\phi(x)|^2}\right)} = n \sqrt{\int_{-\infty}^{+\infty} dx |\phi'(x)|^2}$$

$$\int_{-\infty}^{+\infty} dx |\phi(x)|^4 \quad (101)$$

$$\int_{-\infty}^{+\infty} dx |\phi(x)|^4 = \frac{1}{\pi\sqrt{2}} \sum_{m,n \in S} e^{-\left(\frac{\sigma(m-n)}{2}\right)^2} |\phi_m \phi_n|^2 \quad (102)$$

In some cases, the cost functions may be further simplified using general algebraic and/or numerical techniques. For example $|\phi(x)|^4$ may be expressed by equation (103) which allows the cost function set out in equation (101) to be re-written as equation (104).

$$|\phi(x)|^4 = \left[\frac{1}{\sqrt{2\pi}} \sum_{n \in S} e^{-\frac{1}{2}(x-(n+\psi)\sigma)^2} |\phi_n|^2\right]^2 \quad (103)$$

$$\int_{-\infty}^{+\infty} dx |\phi(x)|^4 = \frac{1}{2\sqrt{\pi}} \sum_{m,n \in S} e^{-\left(\frac{\sigma(m-n)}{2}\right)^2} |\phi_m \phi_n|^2 \quad (104)$$

In some cases, instead of selecting weights that minimize one of the continuous cost functions described above, an equivalent discrete cost function may be minimized. Example discrete versions of the continuous Gaussian, norm and spectral cost functions described above are shown in equations (105), (106) and (107) respectively where $n \notin S \Rightarrow \phi_n = 0$. The discrete versions of the cost function may be easier to work with and/or solve. The discrete versions may be more suitable for on-the fly calculations of the weight. However, minimizing a discrete version of a continuous cost function may still be fairly time and/our resource intensive.

$$\sum_{n \in S} |\phi_{n+1} - \phi_n|^2 + \sum_{n \in S} |(\phi_n - \phi_{n-1}|^2 \quad (105)$$

$$\sum_{n \in S} |\phi_n|^4 \quad (106)$$

$$\sum_{n \in S} |(\phi_{n+1} - \phi_n)\phi_n|^2 + \sum_{n \in S} |(\phi_n - \phi_{n-1})\phi_n|^2 \quad (107)$$

Texture Filtering Unit and Graphics Processing System

Figure 15:
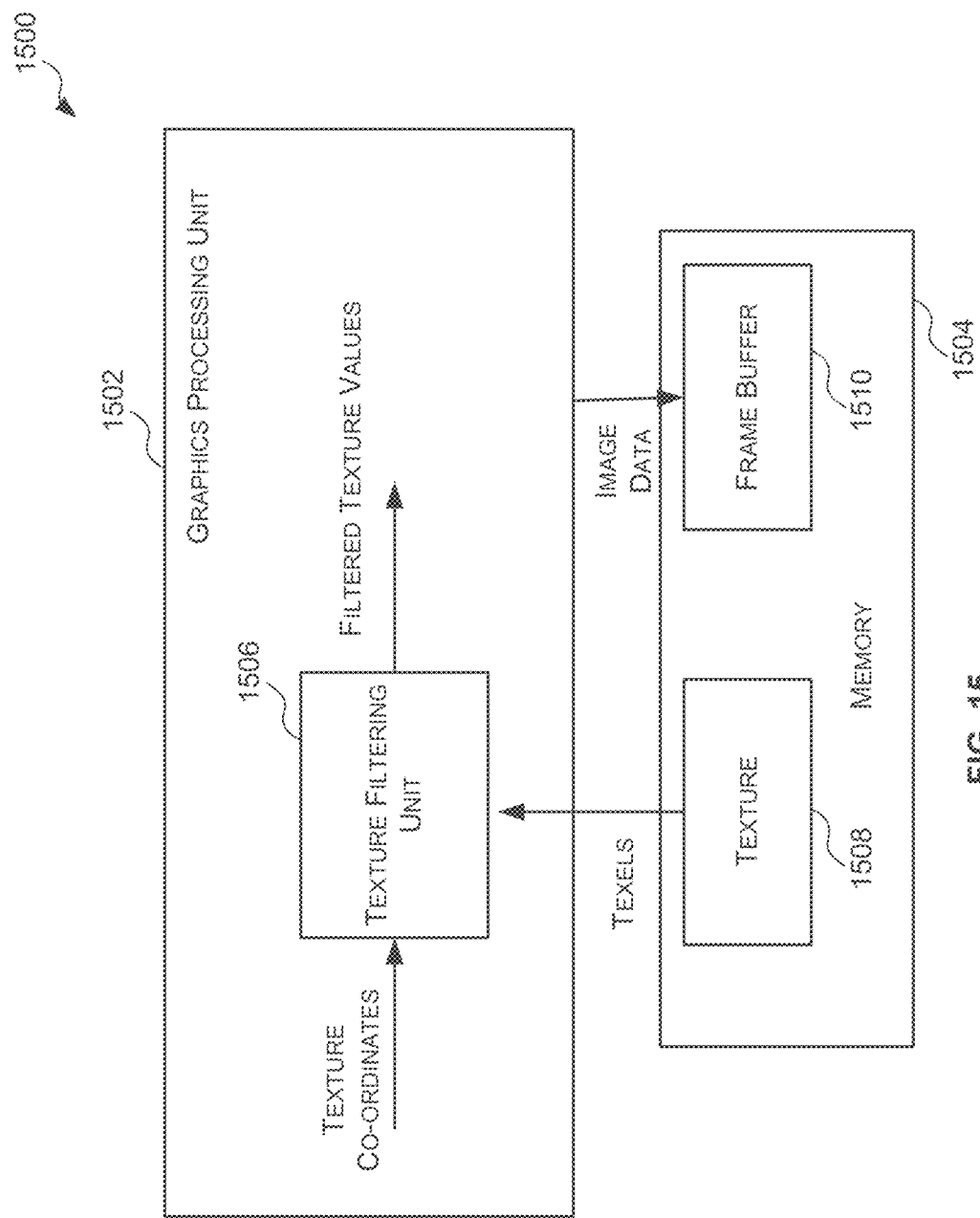
FIG. 15 is a block diagram of an example graphics processing system which comprises a texture filtering unit configured to perform the method of FIG. 4, the method of FIG. 8 and/or the method of FIG. 12.

Reference is now made to FIG. 15 which illustrates an example graphics processing system 1500. The graphics processing system 1500 comprises a graphics processing unit (GPU) 1502 and a memory 1504. The GPU comprises a texture filtering unit 1506. The texture filtering unit 1506 is configured to perform anisotropic texture filtering in accordance with any of the methods described herein. The texture filtering unit 1506 may be configured to receive texture co-ordinates from, for example, a shader program, and perform anisotropic filtering based on the received texture co-ordinates. In general, the texture filtering unit 1506 may be implemented in hardware (e.g. fixed function circuitry), software, or a combination thereof, but it may be preferable for it to be implemented in hardware because this tends to provide a lower latency texture filtering operation, at the cost of inflexibility of operation, but since the desired operation of the texture filtering unit 1506 is known at design time, its operation does not need to be flexible. The memory 1504 comprises a portion of memory 1508 for storing a texture (e.g. storing a mipmap representing the texture) and a portion of memory 1510 (which may be referred to as a frame buffer) for storing image data (e.g. rendered pixel values) which are output from the GPU 1502.

Figure 16:
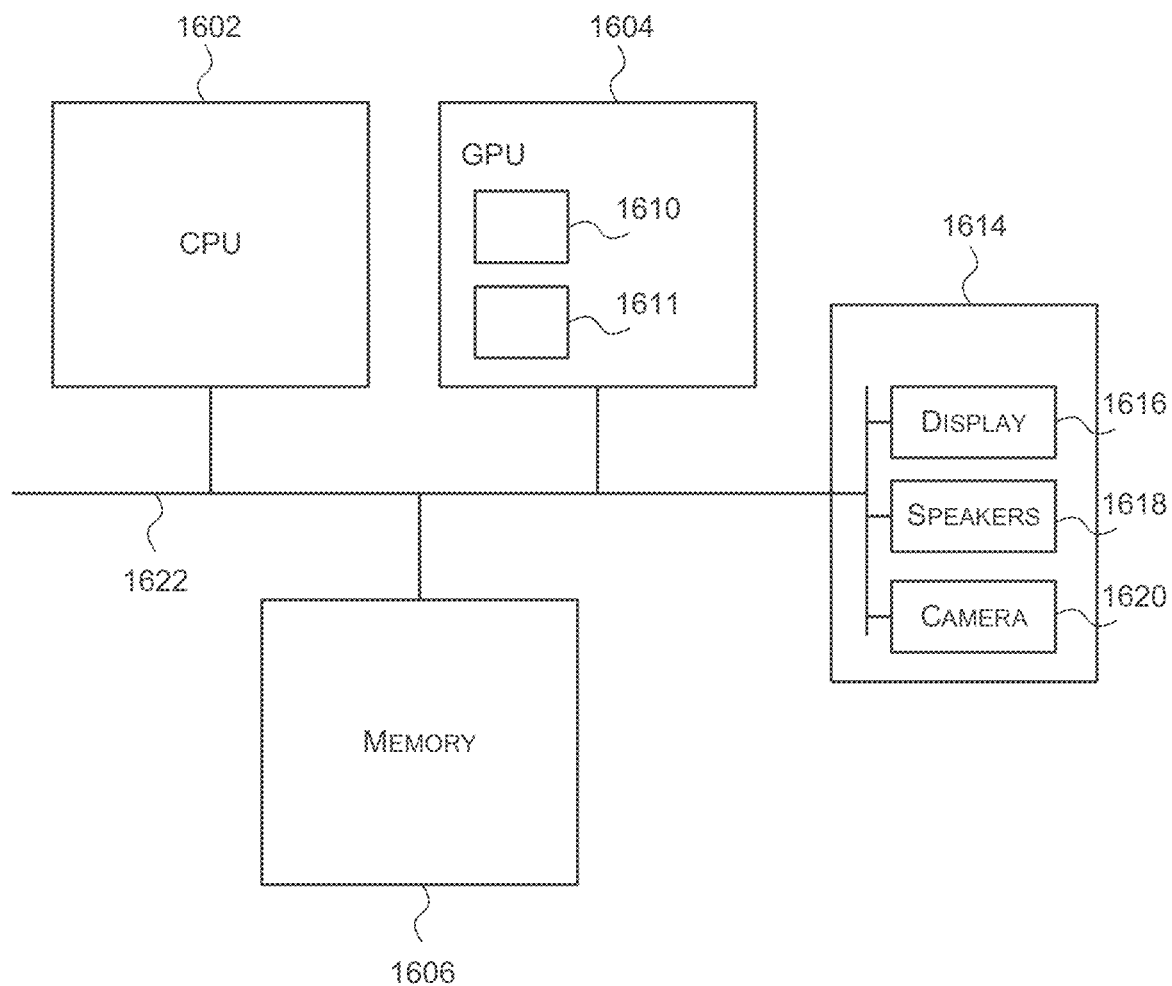
FIG. 16 is a block diagram of an example computer system in which the texture filtering units and/or the graphics processing systems described herein may be implemented.

FIG. 16 shows a computer system in which the texture filtering units and/or graphics processing systems described herein may be implemented. The computer system comprises a CPU 1602, a GPU 1604, a memory 1606 and other devices 1614, such as a display 1616, speakers 1618 and a camera 1620. A processing block 1610 (corresponding to the texture filtering unit 1506 of FIG. 15) is implemented on the GPU 1604 as well as a Neural Network Accelerator (NNA) 1611. In other examples, the processing block 1610 may be implemented on the CPU 1602 or within the NNA 1611. The components of the computer system can communicate with each other via a communications bus 1622.

While FIG. 16 illustrates one implementation of a graphics processing system, it will be understood that a similar block diagram could be drawn for an artificial intelligence accelerator system—for example, by replacing either the CPU 1602 or the GPU 1604 with a Neural Network Accelerator (NNA) 1611, or by adding the NNA as a separate unit. In such cases, again, the processing block 1610 can be implemented in the NNA.

The texture filtering unit and graphics processing system of FIG. 15 are shown as comprising a number of functional blocks. This is schematic only and is not intended to define a strict division between different logic elements of such entities. Each functional block may be provided in any suitable manner. It is to be understood that intermediate values described herein as being formed by a unit or system need not be physically generated by the unit or system at any point and may merely represent logical values which conveniently describe the processing performed by the unit or system between its input and output.

The texture filtering units and/or the graphics processing systems described herein may be embodied in hardware on an integrated circuit. The texture filtering units and/or the graphics processing system described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a texture filtering unit and/or a graphics processing system configured to perform any of the methods described herein, or to manufacture a texture filtering unit and/or a graphics processing system comprising any apparatus described herein. An integrated circuit definition dataset may be, for example, an integrated circuit description.

Therefore, there may be provided a method of manufacturing, at an integrated circuit manufacturing system, a texture filtering unit and/or a graphics processing system as described herein. Furthermore, there may be provided an integrated circuit definition dataset that, when processed in an integrated circuit manufacturing system, causes the method of manufacturing a texture filtering unit and/or a graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a texture filtering unit or a graphics processing system as described herein will now be described with respect to FIG. 17.

Figure 17:
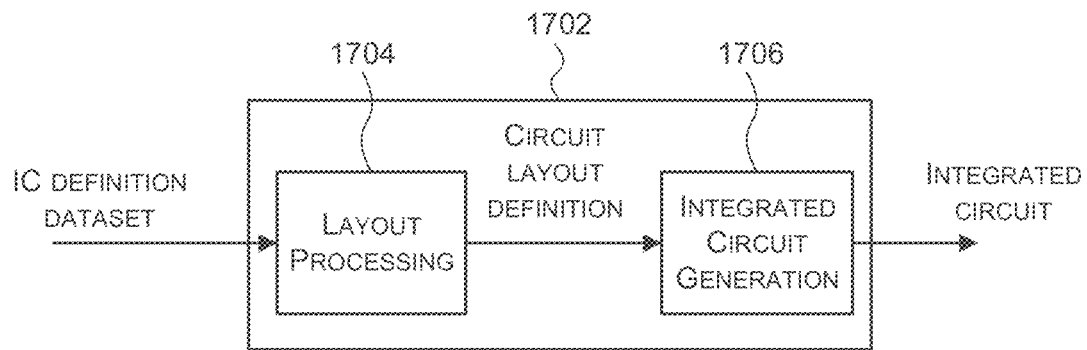
FIG. 17 is a block diagram of an example integrated circuit manufacturing system for generating an integrated circuit embodying a texture filtering unit and/or a graphics processing system as described herein.

FIG. 17 shows an example of an integrated circuit (IC) manufacturing system 1702 which is configured to manufacture a texture filtering unit and/or a graphics processing system as described in any of the examples herein. In particular, the IC manufacturing system 1702 comprises a layout processing system 1704 and an integrated circuit generation system 1706. The IC manufacturing system 1702 is configured to receive an IC definition dataset (e.g. defining a texture filtering unit or a graphics processing system as described in any of the examples herein), process the IC definition dataset, and generate an IC according to the IC definition dataset (e.g. which embodies a texture filtering unit, or a graphics processing system as described in any of the examples herein). The processing of the IC definition dataset configures the IC manufacturing system 1702 to manufacture an integrated circuit embodying a texture filtering unit or a graphics processing system as described in any of the examples herein.

The layout processing system 1704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1704 has determined the circuit layout it may output a circuit layout definition to the IC generation system 1706. A circuit layout definition may be, for example, a circuit layout description.

The IC generation system 1706 generates an IC according to the circuit layout definition, as is known in the art. For example, the IC generation system 1706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1706 may be in the form of computer-readable code which the IC generation system 1706 can use to form a suitable mask for use in generating an IC.

The different processes performed by the IC manufacturing system 1702 may be implemented all in one location, e.g. by one party. Alternatively, the IC manufacturing system 1702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a texture filtering unit or a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 17 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 17, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of performing anisotropic texture filtering, the method comprising:
   generating one or more parameters describing an elliptical footprint in texture space;
   performing isotropic filtering at each of a plurality of sampling points along a major axis of the elliptical footprint, wherein a spacing between adjacent sampling points of the plurality of sampling points is proportional to $\sqrt{1-\eta^{-2}}$ units, wherein $\eta$ is a ratio of a major radius of an ellipse to be sampled and a minor radius of the ellipse to be sampled, wherein the ellipse to be sampled is based on the elliptical footprint; and
   combining results of the isotropic filtering at the plurality of sampling points with a Gaussian filter to generate at least a portion of a filter result.

2. The method of claim 1, wherein the spacing between adjacent sampling points of the plurality of sampling points is proportional to $\sqrt{1-\eta^{-2}}$ units by a proportionality factor, the proportionality factor being $$\frac{1}{\beta},$$

where $\beta$ is a sampling rate of the Gaussian filter.

3. The method of claim 1, wherein the spacing between adjacent sampling points of the plurality of sampling points is proportional to $\sqrt{1-\eta^{-2}}$ units by a proportionality factor, the proportionality factor being $$\frac{1}{\beta}*\frac{\eta}{\lceil\eta\rceil},$$

where $\beta$ is a sampling rate or the Gaussian filter.

4. The method of claim 1, wherein a unit corresponds to the minor radius of the ellipse to be sampled.

5. The method of claim 1, wherein performing isotropic filtering at each of the plurality of sampling points comprises performing bilinear filtering at each of the plurality of sampling points or performing trilinear filtering at each of the plurality of sampling points.

6. The method of claim 1, wherein performing isotropic filtering at a sampling point of the plurality of sampling points comprises:
   performing a first isotropic filtering at the sampling point at a first mipmap level;
   performing a second isotropic filtering at the sampling point at a second mipmap level; and
   interpolating between a result of the first isotropic filtering and a result of the second isotropic filtering to generate a result of the isotropic filtering for the sampling point.

7. The method of claim 1, wherein the ellipse to be sampled is the ellipse defined by the elliptical footprint.

8. The method of claim 1, wherein performing isotropic filtering at each of the plurality of sampling points comprises performing first isotropic filtering at each sampling point of the plurality of sampling points; and the method further comprises:
   performing second isotropic filtering at each of a second plurality of sampling points along the major axis of the elliptical footprint, wherein a spacing between adjacent sampling points of the second plurality of sampling points is proportional to $\sqrt{1-\eta^{-2}}$ units, wherein $\eta$ is a ratio of a major radius of a second ellipse to be sampled and a minor radius of the second ellipse to be sampled, wherein the second ellipse to be sampled is based on the elliptical footprint;
   combining results of the second isotropic filtering; and
   interpolating between the combination of the results of the first isotropic filtering and the combination of the results of the second isotropic filtering.

9. The method of claim 8, wherein the first isotropic filtering is performed at a first mipmap level and the second isotropic filtering is performed at a second mipmap level.

10. The method of claim 8, wherein the ellipse to be sampled is a higher eccentricity ellipse with respect to the elliptical footprint, and the second ellipse to be sampled is a lower eccentricity ellipse with respect to the elliptical footprint.

11. The method of claim 8, wherein the ellipse to be sampled has the same eccentricity as the elliptical footprint and is larger than the elliptical footprint, and the second ellipse to be sampled has the same eccentricity as the elliptical footprint and is smaller than the elliptical footprint.

12. The method of claim 1, wherein the plurality of sampling points are symmetrically positioned about the midpoint of the major axis of the elliptical footprint.

13. The method of claim 1, wherein the plurality of sampling points comprises N sampling points, wherein N is equal to $2\alpha\beta\lceil\eta\rceil$, $2\alpha$ is a width of the Gaussian filter in standard deviations, and $\beta$ is a sampling rate of the Gaussian filter.

14. The method of claim 1, wherein a location of the plurality of sampling points is expressed by $$(n+\psi)(\kappa)\sqrt{1-\eta^{-2}}\,\rho_-\left(\frac{\rho_+}{\rho_+}\right)$$

where n is any integer in the half-open interval $$\left[-\frac{N}{2}-\psi, +\frac{N}{2}-\psi\right),$$

$\psi$ is an offset between −1 and 1, the plurality of sampling points comprises N sampling points, the spacing between adjacent sampling points of the plurality of sampling points is proportional to $\sqrt{1-\eta^{-2}}$ units by a proportionality factor $\kappa$, $\rho_-$ is the minor radius of the ellipse to be sampled, $\rho_+$ is the major radius of the ellipse to be sampled and $\rho_+$ is a major axis radius vector.

15. The method of claim 1, wherein the one or more parameters describing the elliptical footprint in texture space comprises one or more of the major axis of the elliptical footprint, a length of the major axis of the elliptical footprint, and a length of the minor axis of the elliptical footprint.

16. The method of claim 1, wherein the results of the isotropic filtering are combined by a sequence of linear interpolations, wherein each linear interpolation in the sequence of linear interpolations comprises blending a result of a previous linear interpolation in the sequence with the isotropic filtering result for one or more of the plurality of sampling points, the one or more of the plurality of sampling points for a linear interpolation being closer to a middle point of the major axis of the elliptical footprint than the one or more of the plurality of sampling points for the previous linear interpolation in the sequence.

17. A method of generating an image, the method comprising performing anisotropic texture filtering in accordance with the method as set forth in claim 1, and generating an image based on the at least a portion of the filter result.

18. A texture filtering unit for use in a graphics processing system, the texture filtering unit configured to perform the method as set forth in claim 1.

19. A non-transitory computer readable storage medium having stored thereon computer readable instructions that, when executed at a computer system, cause the computer system to perform the method as set forth in claim 1.

20. A non-transitory computer readable storage medium having stored thereon a computer readable dataset description of the texture filtering unit as set forth in claim 18 that, when processed in an integrated circuit manufacturing system, causes the integrated circuit manufacturing system to manufacture an integrated circuit embodying the texture filtering unit.

\* \* \* \* \*